US007095014B2

(12) United States Patent
Hoyes

(10) Patent No.: US 7,095,014 B2
(45) Date of Patent: Aug. 22, 2006

(54) MASS SPECTROMETER

(75) Inventor: John Brian Hoyes, Heaton Moor (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 11/002,423

(22) Filed: Dec. 3, 2004

(65) Prior Publication Data

US 2005/0092911 A1 May 5, 2005

Related U.S. Application Data

(63) Continuation-in-part of application No. 10/176,072, filed on Jun. 21, 2002.

(30) Foreign Application Priority Data

May 17, 2002 (GB) ................................ 0211373.6
May 31, 2002 (GB) ................................ 0212641.5
Sep. 23, 2002 (GB) ................................ 0222055.6

(51) Int. Cl.
*B01D 59/44* (2006.01)

(52) U.S. Cl. ........................ 250/282; 250/281; 250/290

(58) Field of Classification Search ................ 250/282, 250/281, 290, 294
See application file for complete search history.

(56) References Cited

U.S. PATENT DOCUMENTS 5,140,158 A 8/1992 Post
5,905,258 A 5/1999 Clemmer et al.
6,040,575 A 3/2000 Whitehouse et al.
6,323,482 B1 11/2001 Clemmer et al.
6,498,342 B1 12/2002 Clemmer
6,507,019 B1 1/2003 Chernushevich et al.
6,559,441 B1 * 5/2003 Clemmer .................... 250/287
6,630,662 B1 10/2003 Loboda
6,683,301 B1 1/2004 Whitehouse et al.
6,744,043 B1 6/2004 Loboda (Continued)

FOREIGN PATENT DOCUMENTS

GB 2382919 6/2003

(Continued)

OTHER PUBLICATIONS

Purves et al., "Mass Spectrometric Characterization of a High-Field Asymmetric Waveform Ion Mobility Spectrometer", Review of Scientific Instruments, vol. 69, No. 12, pp. 4094-4105, 1998.

(Continued)

*Primary Examiner*—Nikita Wells
*Assistant Examiner*—Anthony Quash
(74) *Attorney, Agent, or Firm*—Diederiks & Whitelaw, PLC

(57) ABSTRACT

A mass spectrometer is disclosed wherein ions having a particular desired charge state are selected by operating an ion mobility spectrometer in combination with a quadrupole mass filter. Precursor ions are fragmented or reacted to form product ions in a collision cell ion trap and sent back upstream to an upstream ion trap. The fragment or product ions are then passed through the ion mobility spectrometer wherein they become temporally separated according to their ion mobility. Fragment or product ions are then re-trapped in the collision cell ion trap before being released therefrom in packets. A pusher electrode of a time of flight mass analyser is energised a predetermined period of time after a packet of ions is released from the collision cell ion trap. Accordingly, it is possible to select multiply charged precursor ions from a background of singly charged ions, fragment them, and mass analyse the fragment ions with a near 100% duty cycle across the whole mass range.

8 Claims, 14 Drawing Sheets

U.S. PATENT DOCUMENTS

| | | | | |
|---|---|---|---|---|
| 6,906,322 | B1 * | 6/2005 | Berggren et al. | 250/288 |
| 2001/0032929 | A1 | 10/2001 | Fuhrer et al. | |
| 2002/0014586 | A1 * | 2/2002 | Clemmer | 250/287 |
| 2003/0001084 | A1 | 1/2003 | Bateman et al. | |

FOREIGN PATENT DOCUMENTS

| | | |
|---|---|---|
| WO | WO 97/07530 | 2/1997 |
| WO | WO 98/56029 | 12/1998 |
| WO | WO 00/08454 | 2/2000 |
| WO | WO 00/08455 | 2/2000 |
| WO | WO 00/08456 | 2/2000 |
| WO | WO 00/08457 | 2/2000 |
| WO | WO 00/70335 | 11/2000 |
| WO | WO 01/69216 | 9/2001 |
| WO | WO 01/69217 | 9/2001 |
| WO | WO 01/69218 | 9/2001 |
| WO | WO 01/69219 | 9/2001 |
| WO | WO 01/69220 | 9/2001 |
| WO | WO 01/69221 | 9/2001 |
| WO | WO 01/69646 | 9/2001 |
| WO | WO 01/69647 | 9/2001 |
| WO | WO 03/067242 | 8/2003 |
| WO | WO 03/067243 | 8/2003 |
| WO | WO 03/067624 | 8/2003 |
| WO | WO 03/067625 | 8/2003 |

OTHER PUBLICATIONS

Griffin et al., "Ion Mass Assignments Based on Mobility Measurements", Analytical Chemistry, vol. 45, No. 7, pp. 1204-1209, 1973.

Villinger et al., "An Evaluation of the Role of Internal Energy and Translational Energy in the Endothermic Proton Transfer Reaction of $N_2H^+$ with Kr", Journal of Chemical Physics, vol. 80, No. 6, pp. 2543-2547, 1984.

Hoaglund et al., "Three-Dimensional Ion Mobility/TOFMS Analysis of Electrosprayed Biomolecules", Analytical Chemistry, vol. 70, No. 11, pp. 2236-2242, 1998.

Henderson et al., "ESI/Ion Trap/Ion Mobility/Time-of-Flight Mass Spectrometry for Rapid and Sensitive Analysis of Biomolecular Mixtures", Analytical Chemistry, vol. 71, No. 2, pp. 291-301, 1999.

Srebalus et al., "Gas-Phase Separations of Electrosprayed Peptide Libraries", Analytical Chemistry, vol. 71, No. 18, pp. 3918-3927, 1999.

Hoaglund et al., "An Ion Trap Interface for ESI-Ion Mobility Experiments", Analytical Chemistry, vol. 69, No. 20, pp. 4156-4161, 1997.

Steiner et al., "Electrospray Ionization With Ambient Pressure Ion Mobility Separation and Mass Analysis by Orthogonal Time-of-Flight Mass Spectrometry", Rapid Communications in Mass Spectrometry, No. 15, pp. 2221-2226, 2001.

Badman et al., "Monitoring Structural Changes of Proteins in an Ion Trap over ~10-200 ms: Unfolding Transitions in Cytochrome *c* Ions", Analytical Chemistry, vol. 73, No. 24, pp. 6000-6007, 2001.

Barnes, et al. "Resolving Iosmeric Peptide Mixtures: A Combined HPLC/Ion Mobility-TOFMS Analysis of a 4000-Component Combinatorial Library", Analytical Chemistry, vol. 74, No. 1, pp. 26-36, 2002.

Purves et al., "Electrospray Ionization High-Field Asymmetric Waveform Ion Mobility Spectrometry-Mass Spectrometry", Analytical Chemistry, vol. 71. No. 13, pp. 2346-2357, 1999.

Liu et al., "Injected-Ion Mobility Analysis of Biomolecules", Analytical Chemistry News & Features, pp. 728-735, 1997.

MacKay et al., "Studies of Reactions Involving $C_2H_x^+$ Ions With HCN Using a Modified Selected Ion Flow Tube", International Journal of Mass Spectrometry and Ion Physics, vol. 36, pp. 259-270, 1980.

Valentine et al., "Gas-Phase Separations of Protease Digests", American Society for Mass Spectrometry, No. 9, pp. 1213-1216, 1998.

Valentine et al., "Multidimensional Separations of Complex Peptide Mixtures: A Combined High-Performance Liquid Chromatography/ion mobility/Time-of-Flight Mass Spectrometry Approach", International Journal of Mass Spectrometry, vol. 212, pp. 97-109, 2001.

Guevremont et al., "Ion Trapping at Atmospheric Pressure (760 Torr) and Room Temperature With a High-Field Asymmetric Waveform Ion Mobility Spectrometer", International Journal of Mass Spectrometry, vol. 193, pp. 45-56, 1999.

Eiceman et al., "A Micro-Machined Ion Mobility Spectrometer-Mass Spectrometer", International Society for Ion Mobility Spectrometry, vol. 3, No. 1, pp. 15-27, 2000.

Javahery et al., "A Segmented Radiofrequency-Only Quadrupole Collision Cell for Measurement of Ion Collision Cross Section on a Triple Quadrupole Mass Spectrometer", American Society for Mass Spectrometry, vol. 8, pp. 697-702, 1997.

Kolaitis et al., "Atmospheric Pressure Ionization Mass Spectrometry With Laser-Produced Ions", Analytical Chemistry, vol. 58, No. 9, pp. 1993-2001, 1986.

Barnes et al., "Assessment of Purity and Screening of Peptide Libraries by Nested Ion Mobility-TOFMS: Identification of RNase S-Protein Binders", Analytical Chemistry, vol. 73, No. 3, pp. 424-433, 2001.

Hoaglund-Hyzer et al., "Ion Trap/Ion Mobility/Quadrupole/Time-of-Flight Mass Spectrometry for Peptide Mixture Analysis", Analytical Chemistry, vol. 73, No. 2, pp. 177-184, 2001.

Hoaglund-Hyzer et al., "Mobility Labeling for Parallel CID of Ion Mixtures", Analytical Chemistry, vol. 72, No. 13, pp. 2737-2740, 2000.

Schwager et al., "The Solitron—New Spectrometer That Uses the Mass Selectivity of a Solitary, Traveling Electric Potential Hill", 42nd ASMS Conference on Mass Spectrometry, pp. 512, 1994..

Harden et al., "Detection of Methyl Isocyanate in Air With the Use of Hand-Held Ion Mobility Spectrometers", Field Analytical Chemistry and Technology, pp. 285-294, 1997.

* cited by examiner

MASS SPECTROMETER

CROSS-REFERENCE TO RELATED APPLICATIONS

This application represents a continuation of U.S. patent application Ser. No. 10/274,949, filed Oct. 22, 2002, pending, which constitutes a continuation-in-part of U.S. patent application Ser. No. 10/176,072 filed Jun. 21, 2002, pending.

BACKGROUND OF THE INVENTION

1. Field of the Invention

The present invention relates to mass spectrometers.

2. Discussion of the Prior Art

With the decoding of the 20–30,000 genes that compose the human genome, emphasis has switched to the identification of the translated gene products that comprise the proteome. Mass spectrometry has firmly established itself as the primary technique for identifying proteins due to its unparalleled speed, sensitivity and specificity. Strategies can involve either analysis of the intact protein, or more commonly digestion of the protein using a specific protease that cleaves at predictable residues along the peptide backbone. This provides smaller stretches of peptide sequence that are more amenable to analysis via mass spectrometry.

The mass spectrometry technique providing the highest degree of specificity and sensitivity is Electrospray ionisation ("ESI") interfaced to a tandem mass spectrometer. These experiments involve separation of the complex digest mixture by microcapillary liquid chromatography with on-line mass spectral detection using automated acquisition modes whereby conventional MS and MS/MS spectra are collected in a data dependant manner. This information can be used directly to search databases for matching sequences leading to identification of the parent protein. This approach can be used to identify proteins that are present at low endogenous concentrations. However, often the limiting factor for identification of the protein is not the quality of the MS/MS spectrum produced but is the initial discovery of the multiply charged peptide precursor ion in the MS mode. This is due to the level of background chemical noise, largely singly charged in nature, which may be produced in the ion source of the mass spectrometer. FIG. 1 shows a typical conventional mass spectrum and illustrates how doubly charged species may be obscured amongst a singly charged background. A method whereby the chemical noise is reduced so that the mass spectrometer can more easily target peptide related ions would be highly advantageous for the study of protein digests.

A known method used to favour the detection of multiply charged species over singly charged species is to use an Electrospray ionisation orthogonal acceleration time of flight mass analyser ("ESI-oaTOF"). The orthogonal acceleration time of flight mass analyser counts the arrival of ions using a Time to Digital Converter ("TDC") which has a discriminator threshold. The voltage pulse of a single ion must be high enough to trigger the discriminator and so register the arrival of an ion. The detector producing the voltage may be an electron multiplier or a Microchannel Plate detector ("MCP"). These detectors are charge sensitive so the size of signal they produce increases with increasing charge state. Discrimination in favour of higher charge states can be accomplished by increasing the discriminator voltage level, lowering the detector gain, or a combination of both. FIG. 2(*a*) shows a mass spectrum obtained with normal detector gain and FIG. 2(*b*) shows a comparable mass spectrum obtained with a reduced detector gain. An important disadvantage of lowering the detector gain (or of increasing the discriminator level) is that the sensitivity is lowered. As can be seen from the ordinate axes of FIGS. 2(*a*) and (*b*), the sensitivity is reduced by a factor of approximately ×4 when a lower detector gain is employed. Using this method it is also impossible to pick out an individual charge state. Instead, the best that can be achieved is a reduction of the efficiency of detection of lower charge states with respect to higher charge states.

Another ionisation technique that has been recently coupled to tandem mass spectrometers for biological mass spectrometry is Matrix Assisted Laser Desorption Ionisation ("MALDI"). When a MALDI ion source is used high levels of singly charged matrix related ions and chemical noise are generated which make it difficult to identify candidate peptide ions.

It is therefore desired to provide an improved mass spectrometer and method of mass spectrometry which does not suffer from some or all of the disadvantages of the prior art.

SUMMARY OF THE INVENTION

According to a first aspect of the present invention, there is provided a method of mass spectrometry, comprising the steps of:

providing a packet or pulse of ions;

temporally separating at least some of the ions in the packet or pulse according to their ion mobility in a first device;

mass filtering at least some of the ions according to their mass to charge ratio in a second device;

progressively varying a mass filtering characteristic of the second device so that ions having a first charge state are onwardly transmitted in preference to ions having a second different charge state;

trapping some ions having the first charge state in a first ion trap;

releasing a first group of ions from the first ion trap and orthogonally accelerating the first group of ions a first predetermined time later;

mass analysing the first group of ions;

trapping further ions having the first charge state in the first ion trap;

releasing a second group of ions from the first ion trap and orthogonally accelerating the second group of ions a second different predetermined time later; and mass analysing the second group of ions.

Advantageously, ions with a chosen charge state can be selected from a mixture of ions having differing charge states. Another advantage is that sensitivity for this technique is greater than the known discriminator level technique as the detector can be run at full gain and all ions present may be counted. According to the preferred embodiment the charge state selection is achieved by coupling an ion mobility spectrometer to a quadrupole mass filter.

As will be explained in more detail later, at any instance in time the mass to charge ratio of ions exiting the combination of the ion mobility spectrometer and the quadrupole mass filter can be predicted. Therefore, the mass to charge ratio of ions present in the first ion trap at any instance can be predicted. A group of ions having a relatively narrow spread of mass to charge ratios can be pulsed or otherwise ejected from the first ion trap and a predetermined time later the pusher/puller electrode of a TOF mass analyser can be energised so as to orthogonally accelerate the ions into the drift region of the TOF mass analyser. The predetermined time (or delay time) can be optimised to that of the mass to charge ratios of the ions present and hence ejected from the first ion trap at any point in time. Accordingly, the ions released from the first ion trap are orthogonally accelerated with a very high (approximately 100%) duty cycle (as will be appreciated by those skilled in the art, if ions having a wide range of mass to charge ratios were to be simultaneously ejected from the first ion trap then only a small percentage (typically <25%) of those ions would then be orthogonally accelerated).

In due course ions having higher average mass to charge ratios will exit the combination of the ion mobility spectrometer and the quadrupole mass filter and will therefore be present in the first ion trap. These ions are released from the first ion trap in another pulse but the delay time of the pusher electrode is increased thereby maintaining a high duty cycle.

By repeating this process a number of times a duty cycle approaching 100% for ions having the chosen charge state(s) across the whole mass range can be achieved. This represents a significant improvement in sensitivity over conventional methods.

According to a second aspect of the present invention, there is provided a method of mass spectrometry, comprising the steps of:

providing a packet or pulse of ions;

temporally separating at least some of the ions in the packet or pulse according to their ion mobility in a first device;

mass filtering at least some of the ions according to their mass to charge ratio in a second device;

progressively varying a mass filtering characteristic of the second device so that ions having a first charge state are onwardly transmitted in preference to ions having a second different charge state;

fragmenting or reacting at least some of the ions having the first charge state into fragment ions or forming product ions;

trapping at least some of the fragment or product ions in a first ion trap; and sending at least some of the fragment or product ions upstream of the first ion trap.

According to the first aspect of the invention it is possible to achieve a 100% duty cycle because the parent ions present in the first ion trap at any particular point in time have a narrow spread of mass to charge ratios. However, according to the second aspect of the invention ions are fragmented or reacted within the first ion trap. Therefore, once the ions have been fragmented or reacted in the first ion trap the ions present in the first ion trap (gas cell) will have a wide range of mass to charge ratios. According to the preferred embodiment the first ion trap (gas cell) comprises an ion tunnel ion trap/collision cell which is not mass selective. Therefore, it is not possible to simply optimise the ejection of fragment or product ions from the first ion trap with the TOF mass analyser and hence a high duty cycle across the mass range can not be achieved.

It is therefore a feature of the second aspect of the present invention that instead of releasing fragment or product ions from the first ion trap and sending the ions directly downstream to the TOF mass analyser (which would result in a low duty cycle), the fragment or product ions are instead sent back upstream of the first ion trap.

As will be described in more detail in relation to further embodiments of the present invention, once the fragment or product ions have been sent upstream they can then be passed through the ion mobility spectrometer which separates the fragment or product ions according to their ion mobility. The fragment or product ions can then be trapped in the first ion trap and the pusher electrode of the TOF mass analyser can be arranged to be energised a predetermined period of time after fragment or product ions have been released from the first ion trap so as to optimise the duty cycle. As fragment or product ions having higher mass to charge ratios subsequently arrive at the first ion trap, the delay time of the pusher electrode can be progressively increased. As a result the fragment or product ions can be mass analysed with a very high (approximately 100%) duty cycle. This represents a further significant advance in the art.

The fragment or product ions which are sent upstream preferably pass through the second device and/or the first device. In such circumstances, the second device is arranged to transmit the fragment or product ions without substantially mass filtering them. The fragment or product ions are then preferably trapped in a second ion trap upstream of the first device.

According to the preferred embodiment, multiply charged ions (which may include doubly, triply and quadruply charged ions and ions having five or more charges) may be preferentially selected and transmitted whilst the intensity of singly charged ions may be reduced. In other embodiments any desired charged state or states may be selected. For example, two or more multiply charged states may be transmitted.

The second device preferably comprises a quadrupole rod set mass filter. The quadrupole mass filter may be operated as a high pass mass to charge ratio filter so as to transmit substantially only ions having a mass to charge ratio greater than a minimum value. In this embodiment multiply charged ions can be preferentially transmitted compared to singly charged ions i.e. doubly, triply, quadruply and ions having five or more charges may be transmitted whilst singly charged ions are attenuated. According to another embodiment, the quadrupole mass filter may be operated as a band pass mass to charge ratio filter so as to substantially transmit only ions having a mass to charge ratio greater than a minimum value and smaller than a maximum value. This embodiment is particularly advantageous in that multiply charged ions of a single charge state e.g. triply charged, may be preferentially transmitted whilst ions having any other charge state are relatively attenuated. However, according to another embodiment ions having two or more neighbouring charge states (e.g. doubly and triply charged ions) may be transmitted and all other charge states may be attenuated. Embodiments are also contemplated wherein non-neighbouring charge states are selected (e.g. doubly and quadruply charged ions) to the preference of other charge states.

The quadrupole mass filter is preferably scanned so that the minimum mass to charge ratio cut-off is progressively increased during a cycle (which is defined as the period between consecutive pulses of ions being admitted into the ion mobility spectrometer). The quadrupole mass filter may be scanned in a substantially continuous (i.e. smooth) manner or alternatively the quadruple mass filter may be scanned in a substantially stepped manner.

Other embodiments are contemplated wherein the second device comprises either a 2D ion trap (e.g. a rod set with front and/or rear trapping electrodes) or a 3D ion trap (e.g. a central ring electrode with front and rear endcap electrodes).

At the upstream end of the mass spectrometer, the ion source may be a pulsed ion source such as a Matrix Assisted Laser Desorption Ionisation ("MALDI") ion source. The pulsed ion source may alternatively comprise a Laser Desorption Ionisation ion source which is not matrix assisted.

Alternatively, and more preferably, a continuous ion source may be used in which case an ion trap for storing ions and periodically releasing ions is also preferably provided. Continuous ion sources which may be used include Electrospray, Atmospheric Pressure Chemical Ionisation ("APCI"), Electron Impact ("EI"), Atmospheric Pressure Photon Ionisation ("APPI") and Chemical Ionisation ("CI") ion sources. Other continuous or pseudo-continuous ion sources may also be used. In an embodiment the mass spectrometer may be a Fourier Transform mass spectrometer or a Fourier Transform Ion Cyclotron Resonance mass spectrometer.

According to a third aspect of the present invention there is provided a method of mass spectrometry, comprising the steps of:

providing a packet or pulse of fragment or product ions;

temporally separating at least some of the fragment or product ions in the packet or pulse according to their ion mobility in a first device;

trapping some fragment or product ions having a first ion mobility in a first ion trap;

releasing a first group of fragment or product ions from the first ion trap and orthogonally accelerating the first group of ions a first predetermined time later;

mass analysing the first group of ions;

trapping further fragment or product ions having a second different ion mobility in the first ion trap;

releasing a second group of fragment or product ions from the first ion trap and orthogonally accelerating the second group of ions a second different predetermined time later; and mass analysing the second group of ions.

According to this embodiment fragment or product ions can be mass analysed with a very high (approximately 100%) duty cycle.

The first device preferably comprises an ion mobility spectrometer or other ion mobility device. Ions in an ion mobility spectrometer may be subjected to an electric field in the presence of a buffer gas so that different species of ion acquire different velocities and are temporally separated according to their ion mobility. The mobility of an ion in an ion mobility spectrometer typically depends inter alia upon its mass and its charge. Heavy ions with one charge tend to have lower mobilities than light ions with one charge. Also an ion of a particular mass to charge ratio with one charge tends to have a lower mobility than an ion with the same mass to charge ratio but carrying two (or more) charges.

The ion mobility spectrometer may comprise a drift tube together with one or more electrodes for maintaining an axial DC voltage gradient along at least a portion of the drift tube. Alternatively, the ion mobility spectrometer may comprise a Field Asymmetric Ion Mobility Spectrometer ("FAIMS"). In one embodiment the FAIMS may comprise two parallel plates. In another embodiment the FAIMS may comprise two axially aligned inner cylinders surrounded by a long outer cylinder. The outer cylinder and a shorter inner cylinder are preferably held at the same electrical potential. A longer inner cylinder may have a high frequency high voltage asymmetric waveform applied to it, thereby establishing an electric field between the inner and outer cylinders. A compensation DC voltage is also applied to the longer inner cylinder. A FAIMS acts like a mobility filter and may operate at atmospheric pressure.

However, according to a particularly preferred embodiment, the ion mobility spectrometer may comprise a plurality of electrodes having apertures wherein a DC voltage gradient is maintained across at least a portion of the ion mobility spectrometer and at least some of the electrodes are connected to an AC or RF voltage supply. The ion mobility spectrometer is particularly advantageous in that the addition of an AC or RF voltage to the electrodes (which may be ring like or otherwise annular) results in radial confinement of the ions passing through the ion mobility spectrometer. Radial confinement of the ions results in higher ion transmission compared with ion mobility spectrometers of the drift tube type.

The ion mobility spectrometer preferably extends between two vacuum chambers so that an upstream section comprising a first plurality of electrodes having apertures is arranged in a vacuum chamber and a downstream section comprising a second plurality of electrodes having apertures is arranged in a further vacuum chamber, the vacuum chambers being separated by a differential pumping aperture.

At least some of the electrodes in the upstream section are preferably supplied with an AC or RF voltage having a frequency within the range 0.1–3.0 MHz. A frequency of 0.5–1.1 MHz is preferred and a frequency of 780 kHz is particularly preferred. The upstream section is preferably arranged to be maintained at a pressure within the range 0.1–10 mbar, preferably approximately 1 mbar.

At least some of the electrodes in the downstream section are preferably supplied with an AC or RF voltage having a frequency within the range 0.1–3.0 MHz. A frequency of 1.8–2.4 MHz is preferred and a frequency of 2.1 MHz is particularly preferred. The downstream section is preferably arranged to be maintained at a pressure within the range $10^{-3}$–$10^{-2}$ mbar.

The voltages applied to the electrodes in the upstream section may be such that a first DC voltage gradient is maintained in use across at least a portion of the upstream section and a second different DC voltage gradient may be maintained in use across at least a portion of the downstream section. The first DC voltage gradient is preferably greater than the second DC voltage gradient. Both voltage gradients do not necessarily need to be linear and indeed a stepped voltage gradient is particularly preferred.

Preferably, the ion mobility spectrometer comprises at least 10, 20, 30, 40, 50, 60, 70, 80, 90 or 100 electrodes. Preferably, at least 60%, 65%, 70%, 75%, 80%, 85%, 90%, 95% of the electrodes forming the ion mobility spectrometer have apertures which are of substantially the same size or area. In a particularly preferred embodiment the ion mobility spectrometer comprises an ion tunnel comprising a plurality of electrodes all having substantially similar sized apertures through which ions are transmitted.

An orthogonal acceleration time of flight mass analyser is particularly preferred although other types of mass analysers such as a quadrupole mass analysers or 2D or 3D ion traps may be used according to less preferred embodiments.

According to a fourth aspect of the present invention, there is provided a mass spectrometer comprising:

a first device for temporally separating a pulse or packet of ions according to their ion mobility;

a second device for mass filtering at least some of the ions in the packet or pulse according to their mass to charge ratio, wherein a mass filtering characteristic of the second device is progressively varied so that ions having a first charge state are onwardly transmitted in preference to ions having a second charge state;

a first ion trap for trapping ions having the first charge state; and a mass analyser comprising an electrode for orthogonally accelerating ions; wherein the first ion trap is arranged to trap some ions having the first charge state and then release a first group of ions which are then orthogonally accelerated by the electrode a first predetermined time later and then subsequently mass analysed by the mass analyser, and wherein the first ion trap is further arranged to trap further ions having the first charge state and then release a second group of ions which are then orthogonally accelerated by the electrode a second different predetermined time later and then subsequently mass analysed by the mass analyser.

According to a fifth aspect of the present invention, there is provided a mass spectrometer comprising:

a first device for temporally separating a pulse or packet of ions according to their ion mobility;

a second device for mass filtering at least some of the ions in the packet or pulse according to their mass to charge ratio, wherein a mass filtering characteristic of the second device is progressively varied so that ions having a first charge state are onwardly transmitted in preference to ions having a second charge state;

a first ion trap comprising a gas for fragmenting ions into fragment ions or reacting with ions to form product ions;

wherein the first ion trap is arranged to trap at least some fragment or product ions and then send the fragment or product ions upstream of the first ion trap.

According to a sixth aspect of the present invention there is provided a mass spectrometer comprising:

a first device for temporally separating at least some fragment or product ions according to their ion mobility;

a first ion trap downstream of the first device;

a second ion trap upstream of the first device; and a mass analyser comprising an electrode for orthogonally accelerating ions;

wherein the second ion trap is arranged to release a packet or pulse of fragment or product ions-so that the fragment or product ions are temporally separated according to their ion mobility in the first device; and wherein the first ion trap is arranged to trap some fragment or product ions having a first ion mobility and then release a first group of ions so that the first group of ions is orthogonally accelerated by the electrode a first predetermined time later and then subsequently mass analysed by the mass analyser and wherein the first ion trap is further arranged to trap further fragment or product ions having a second different ion mobility and then release a second group of ions so that the second group of ions is orthogonally accelerated by the electrode a second different predetermined time later and then subsequently mass analysed by the mass analyser.

According to a seventh aspect of the present invention, there is provided a method of mass spectrometry, comprising the steps of:

selecting ions having a desired charge state(s) whilst filtering out ions having an undesired charge state(s);

trapping ions having the desired charge state(s) in an ion trap; and synchronising the release of ions from the ion trap with the operation of an electrode for orthogonally accelerating ions so that at least 70%, 80%, or 90% of the ions released from the ion trap are orthogonally accelerated by the electrode.

Preferably, the step of selecting ions having a desired charge state(s) comprises passing ions through an ion mobility spectrometer whilst scanning a quadrupole mass filter.

According to an eighth aspect of the present invention there is provided a mass spectrometer, comprising:

a device for selecting ions having a desired charge state(s) whilst filtering out ions having an undesired charge state(s);

an ion trap for trapping ions having a-desired charge state(s); and wherein the ion trap is arranged to release ions in synchronisation with the operation of an electrode for orthogonally accelerating ions so that at least 70%, 80%, or 90% of the ions released from the ion trap are orthogonally accelerated by the electrode.

Preferably, the device for selecting ions comprises an ion mobility spectrometer and a quadrupole mass filter which is scanned in use.

According to a ninth aspect of the present invention there is provided a method of mass spectrometry, comprising the steps of:

selecting ions having a desired charge state(s) whilst filtering out ions having an undesired charge state(s);

fragmenting or reacting at least some of the ions having a desired charged state(s) into fragment or product ions;

trapping at least some of the fragment or product ions in an ion trap; and sending at least some of the fragment or product ions upstream of the ion trap.

Preferably, the step of selecting ions having a desired charge state(s) comprises passing ions through an ion mobility spectrometer whilst scanning a quadrupole mass filter.

According to a tenth aspect of the present invention there is provided a mass spectrometer comprising:

a device for selecting ions having a desired charge state(s) whilst filtering out ions having an undesired charge state(s); and a device for fragmenting or reacting at least some of the ions having a desired charge state(s) so as to form fragment or product ions;

a device for trapping the fragment or product ions; and wherein the device for trapping ions is arranged to send at least some of the fragment or product ions upstream of the device for trapping ions.

Preferably, the device for selecting ions comprises an ion mobility spectrometer and a quadrupole mass filter which is scanned in use.

According to an eleventh aspect of the present invention there is provided a method of mass spectrometry, comprising the steps of:

separating fragment or product ions according to their ion mobility;

trapping some fragment or product ions in an ion trap; and synchronising the release of fragment or product ions from the ion trap with the operation of an electrode for orthogonally accelerating ions so that at least 70%, 80%, or 90% of the fragment or product ions released from the ion trap are orthogonally accelerated by the electrode.

Preferably, the step of separating fragment or product ions comprises passing the fragment or product ions through an ion mobility spectrometer.

According to a twelfth aspect of the present invention, there is provided a mass spectrometer, comprising:

a device for separating fragment or product ions according to their ion mobility; and an ion trap for trapping some fragment or product ions;

wherein the ion trap is arranged to release fragment or product ions in synchronisation with the operation of an electrode for orthogonally accelerating ions so that at least 70%, 80%, or 90% of the fragment or product ions released from the ion trap are orthogonally accelerated by the electrode.

Preferably, the device for separating fragment or product ions comprises an ion mobility spectrometer.

BRIEF DESCRIPTION OF THE DRAWINGS

Various embodiments of the present invention will now be described, by way of example only, and with reference to the accompanying drawings in which:

FIG. 2(*b*) shows a comparable mass spectrum obtained by lowering the detector gain;

FIG. 8(*b*) illustrates the various DC voltages which may be applied to the ion trap, ion gate and ion mobility spectrometer;

FIG. 8(*c*) illustrates how the DC voltage applied to the ion gate may vary as a function of time;

FIG. 8(*d*) illustrates how a quadrupole mass filter may be scanned according to a preferred embodiment;

DETAILED DESCRIPTION OF THE PREFERRED EMBODIMENTS

Figure 1:
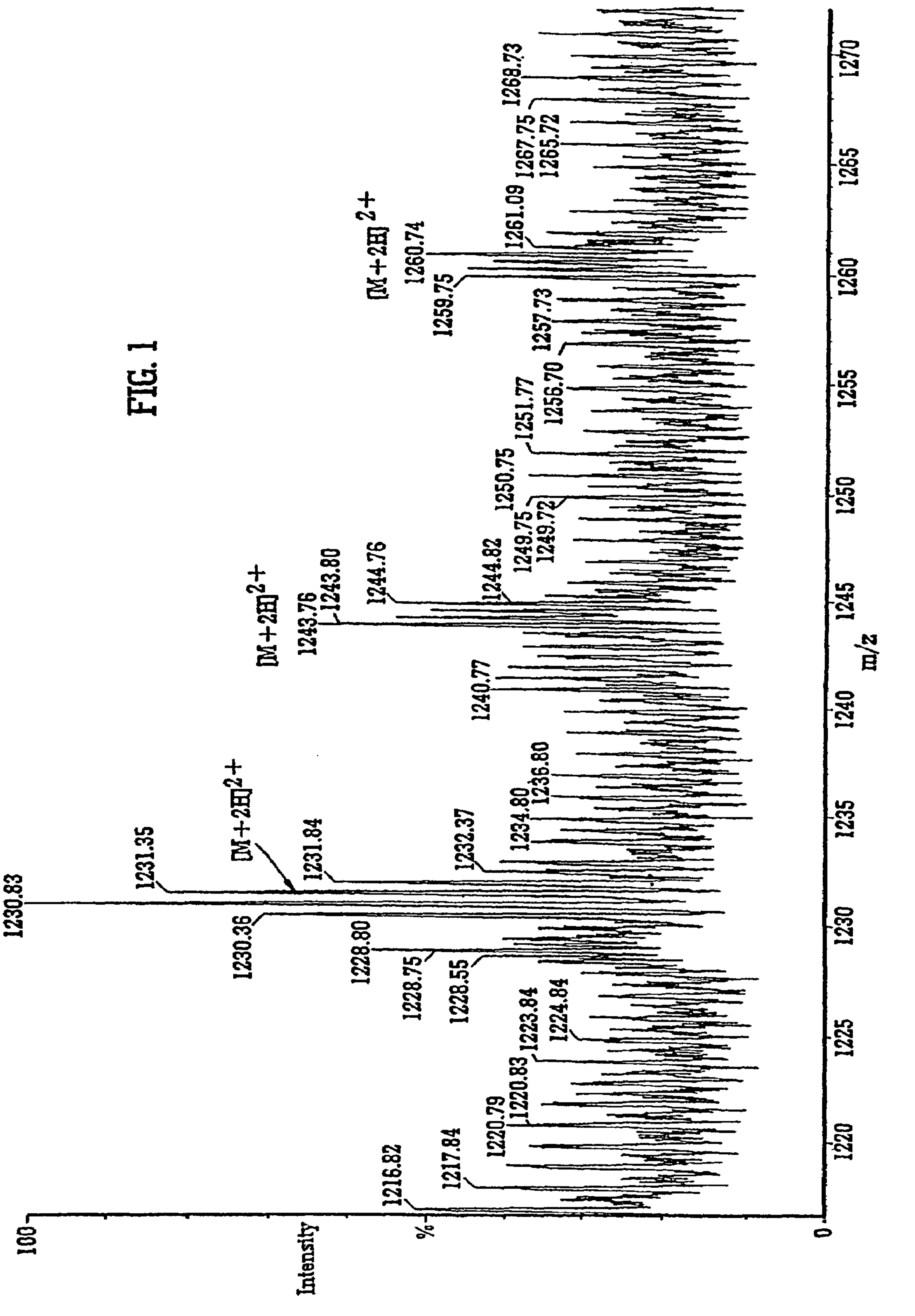
FIG. 1 shows a conventional mass spectrum.
Figures 2A, 2B:
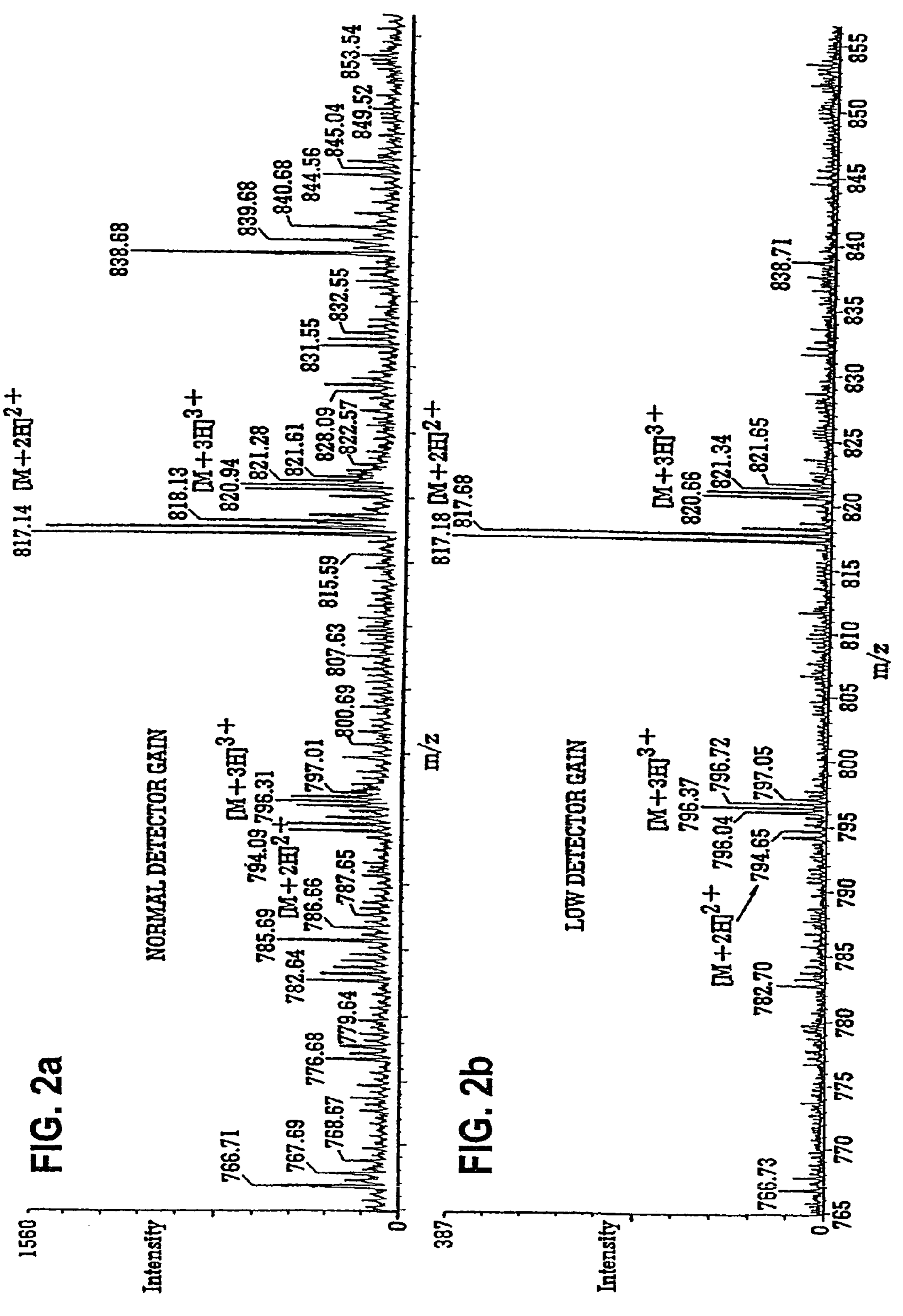
FIG. 2(*a*) shows a conventional mass spectrum obtained with normal detector gain.
Figure 3:
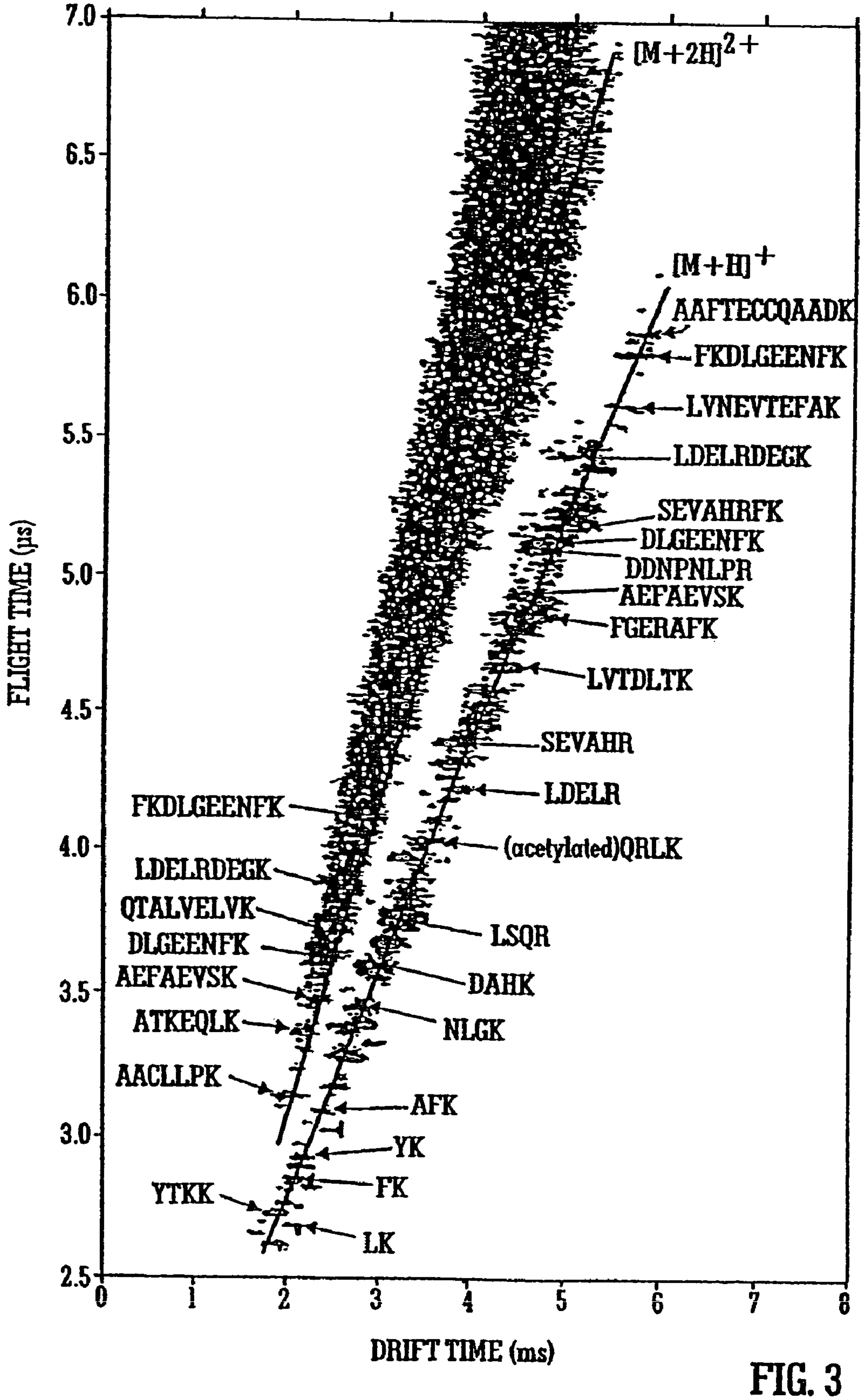
FIG. 3 shows the relationship between flight time in a time of flight mass analyser drift region versus drift time in an ion mobility spectrometer for various singly and doubly charged ions.
Figure 4:
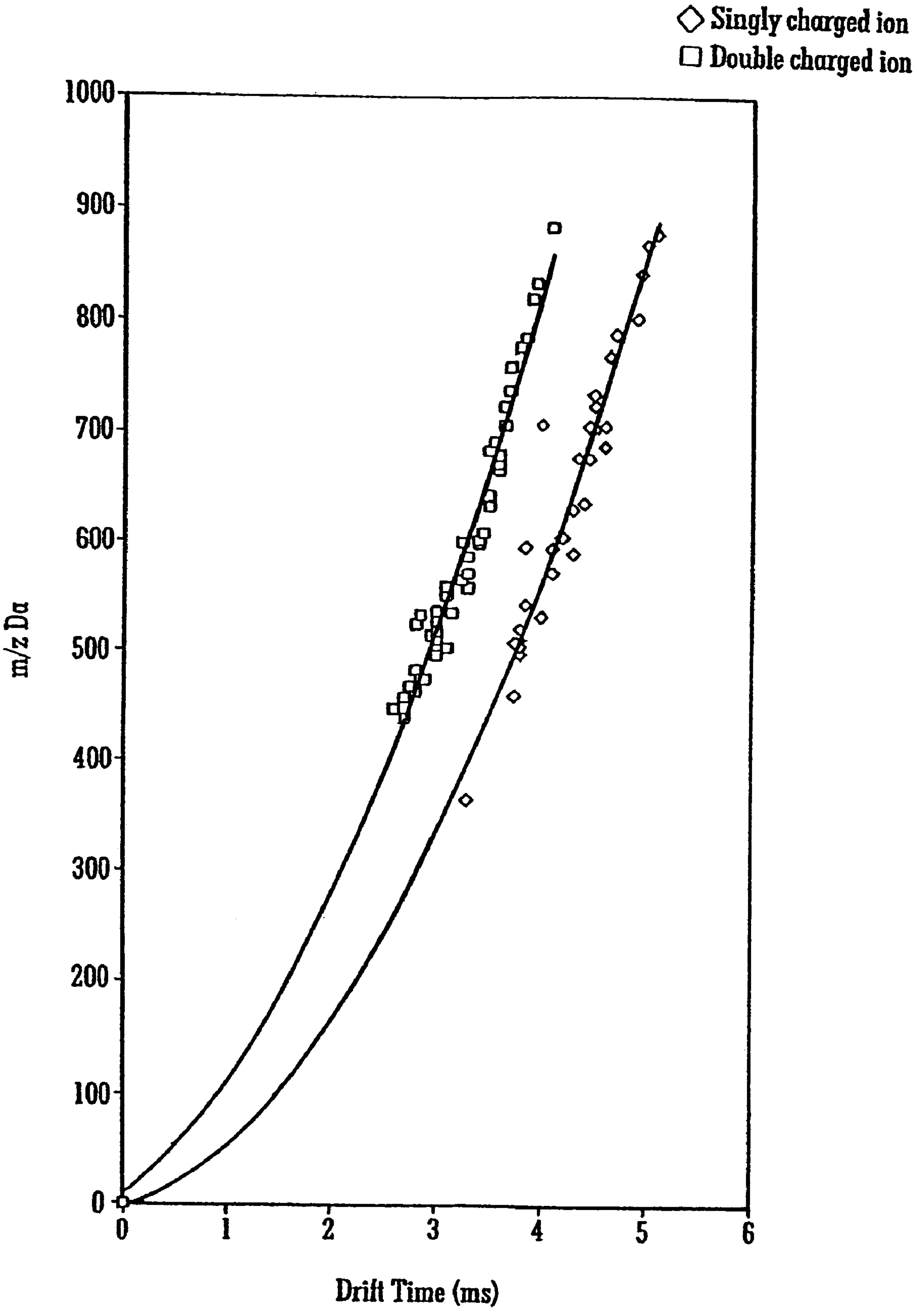
FIG. 4 shows an experimentally determined relationship between the mass to charge ratio of a sample of singly and doubly charged ions and their drift time through an ion mobility spectrometer.

Various embodiments of the present invention will now be described. FIG. 3 shows the relationship of flight time in a drift region of a time of flight mass analyser versus drift time in an ion mobility spectrometer for various singly and doubly charged ions. An experimentally determined relationship between the mass to charge ratio of ions and their drift time through an ion mobility spectrometer is shown in FIG. 4. This relationship can be represented by an empirically derived polynomial expression. As can be seen from these figures, a doubly charged ion having the same mass to charge ratio as a singly charged ion will take less time to drift through an ion mobility spectrometer compared with a singly charged ion. Although the ordinate axis of FIG. 3 is given as the flight time through the drift region of a time of flight mass analyser, it will be appreciated that this correlates directly with the mass to charge ratio of the ion.

If a mass filter is provided in combination with an ion mobility spectrometer, and if the mass filter is scanned (i.e. the transmitted range of mass to charge ratios is varied) in synchronisation with the drift of ions through the ion mobility spectrometer, then it is possible to arrange that only ions having a particular charge state (e.g. multiply charged ions) will be transmitted onwardly e.g. to a mass analyser. The ability to be able to substantially filter out singly charged background ions and/or to select ions of one or more specific charge states for analysis represents a significant advance in the art.

Figure 5:
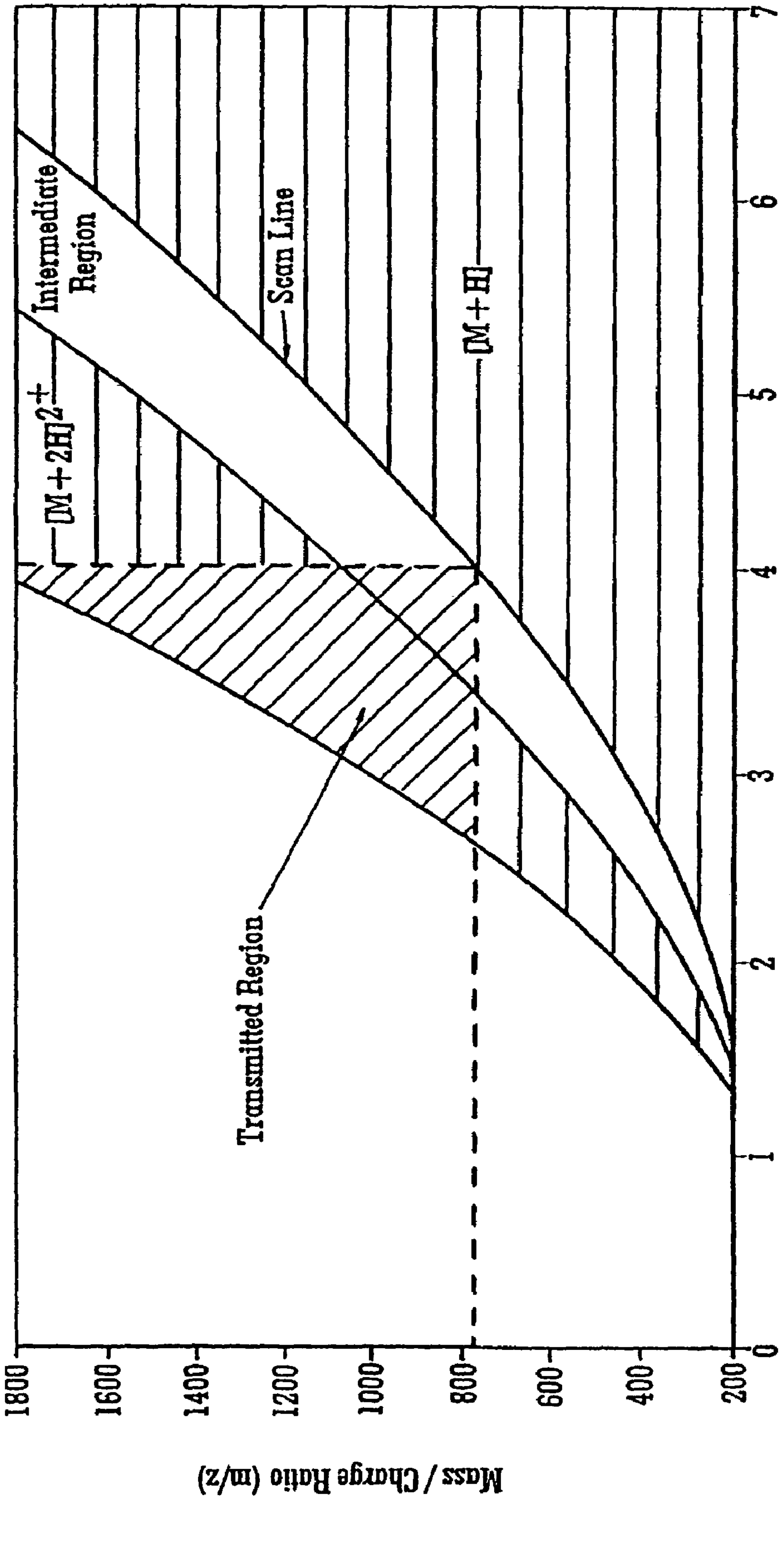
FIG. 5 illustrates the general principle of filtering out singly charged ions according to a preferred embodiment.

FIG. 5 illustrates the principle of charge state selection. The known data of FIG. 3 and the experimentally derived data of FIG. 4 can be interpreted such that all ions having the same charge state can be considered to fall within a distinct region or band of a 2D plot of mass to charge ratio versus drift time through an ion mobility spectrometer. In FIG. 5 singly and doubly charged ions are shown as falling within distinct bands with an intermediate region therebetween where very few ions of interest are to be found. Triply and quadruply charged ions etc. are not shown for ease of illustration only. The large area below the "scan line" can be considered to represent singly charged ions and the other area can be considered to represent doubly charged ions.

According to a preferred embodiment, a mass filter is provided which is synchronised with the operation of an ion mobility spectrometer. Considering FIG. 5, it can be seen that at a time around 4 ms after ions have first entered or been admitted to the drift region of the ion mobility spectrometer, ions may be emerging from the ion mobility spectrometer with various different mass to charge ratios. Those ions which emerge with a mass to charge ratio of approximately 1–790 are most likely to be singly charged ions whereas those ions emerging with a mass to charge ratio of approximately 1070–1800 are most likely to be doubly charged ions. Very few, if any, ions will emerge at that point of time with a mass to charge ratio between 790–1070 (which corresponds with the intermediate region of the graph). Therefore, if the mass filter is set at this particular point in time so as to transmit only ions having a mass to charge ratio >790 then it can be assumed that the majority of the singly charged ions will not be onwardly transmitted whereas doubly charged ions (and ions having a higher charge state) will be substantially onwardly transmitted. If the mass filter is operated as a high pass mass filter and if the minimum cut-off mass to charge ratio of the mass filter follows in real time the "scan line" shown in FIG. 5 (i.e. if it tracks the upper predetermined mass to charge ratio for singly charged ions as a function of time) then it will be appreciated that only multiply charged ions will substantially be onwardly transmitted.

According to other embodiments the mass filter may track the lower predetermined mass to charge ratio for doubly charged ions. The cut-off mass to charge ratio may also lie for at least a portion of a cycle within the intermediate region which separates the regions comprising singly and doubly charged ions. The minimum cut-off mass to charge ratio of the mass filter may also vary in a predetermined or random manner between the upper threshold of the singly charged ion region, the intermediate region and the lower threshold of the doubly charged ion region. It will also be appreciated that according to less preferred embodiments, the minimum cut-off mass to charge ratio may fall for at least a portion of time within the region considered to comprise either singly or doubly charged ions. In such circumstances, ions of a potentially unwanted charge state may still be transmitted, but the intensity of such ions will nonetheless be reduced.

According to a preferred embodiment the minimum cut-off mass to charge ratio is varied smoothly, and is preferably increased with time. Alternatively, the minimum cut-off mass to charge ratio may be increased in a stepped manner.

Figure 6:
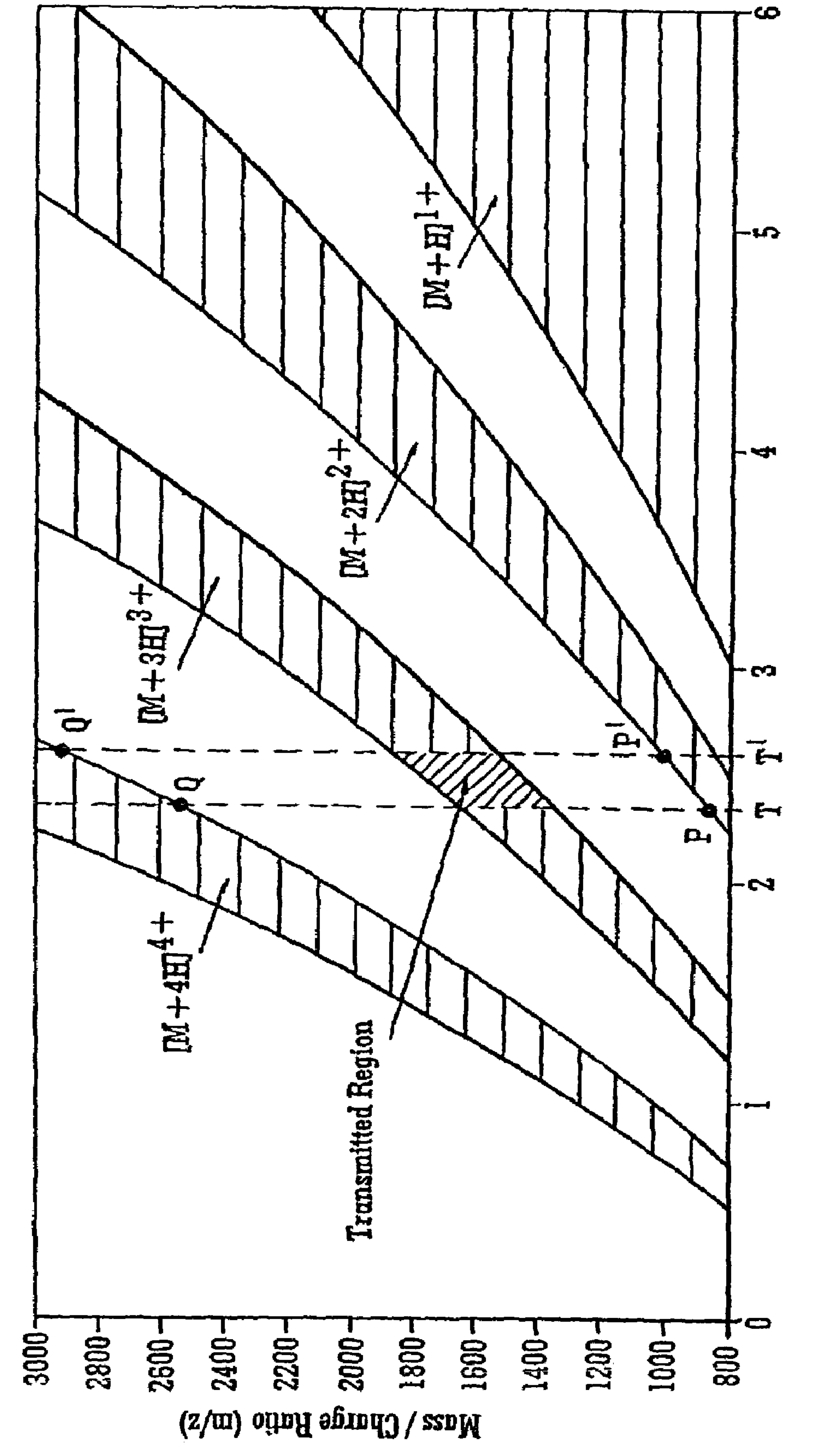
FIG. 6 illustrates the general principle of selecting ions having a specific charge state according to a preferred embodiment.

FIG. 6 illustrates how the basic arrangement described in relation to FIG. 5 may be extended so that ions of a specific charge state(s) may be selected. In the arrangement illustrated in FIG. 6 the mass filter is operated as a band pass mass to charge ratio filter so as to select ions of a specific charge state (in this case triply charged ions) in preference to ions having any other charge state. At a time T after ions have first been admitted or introduced into the ion mobility spectrometer, the mass filter, being operated in a band pass mode, is set so as to transmit ions having a mass to charge ratio >P and <Q, wherein P preferably lies on the upper threshold of the region containing doubly charged ions and Q preferably lies on the lower threshold of the region containing quadruply charged ions. The upper and lower mass cut-offs P,Q are preferably smoothly increased with time so that at a later time T', the lower mass to charge ratio cut-off of the band pass mass to charge ratio filter has been increased from P to P' and the upper mass to charge ratio cut-off of the band pass mass to charge ratio filter has been increased from Q to Q'. As with the arrangement described in relation to FIG. 5, the upper and lower mass to charge ratio cut-offs do not need to follow the lower and upper thresholds of any particular charge state region, and according to the other embodiments the upper and lower cut-offs may fall within one or more intermediate regions and/or one or more of the bands in which ions having a particular charge state are to be found. For example, in one embodiment, the lower and upper mass to charge ratio cut-offs may simply follow the thresholds of the region comprising doubly, triply, quadruply etc. charged ions. According to other embodiments two, three, four or more charge states may be selected in preference to any other charge state (e.g. doubly and triply charged ions may be transmitted). Embodiments are also contemplated wherein non-neighbouring charge states (e.g. doubly and quadruply charged ions) are transmitted but not any other charge states.

Figure 7:
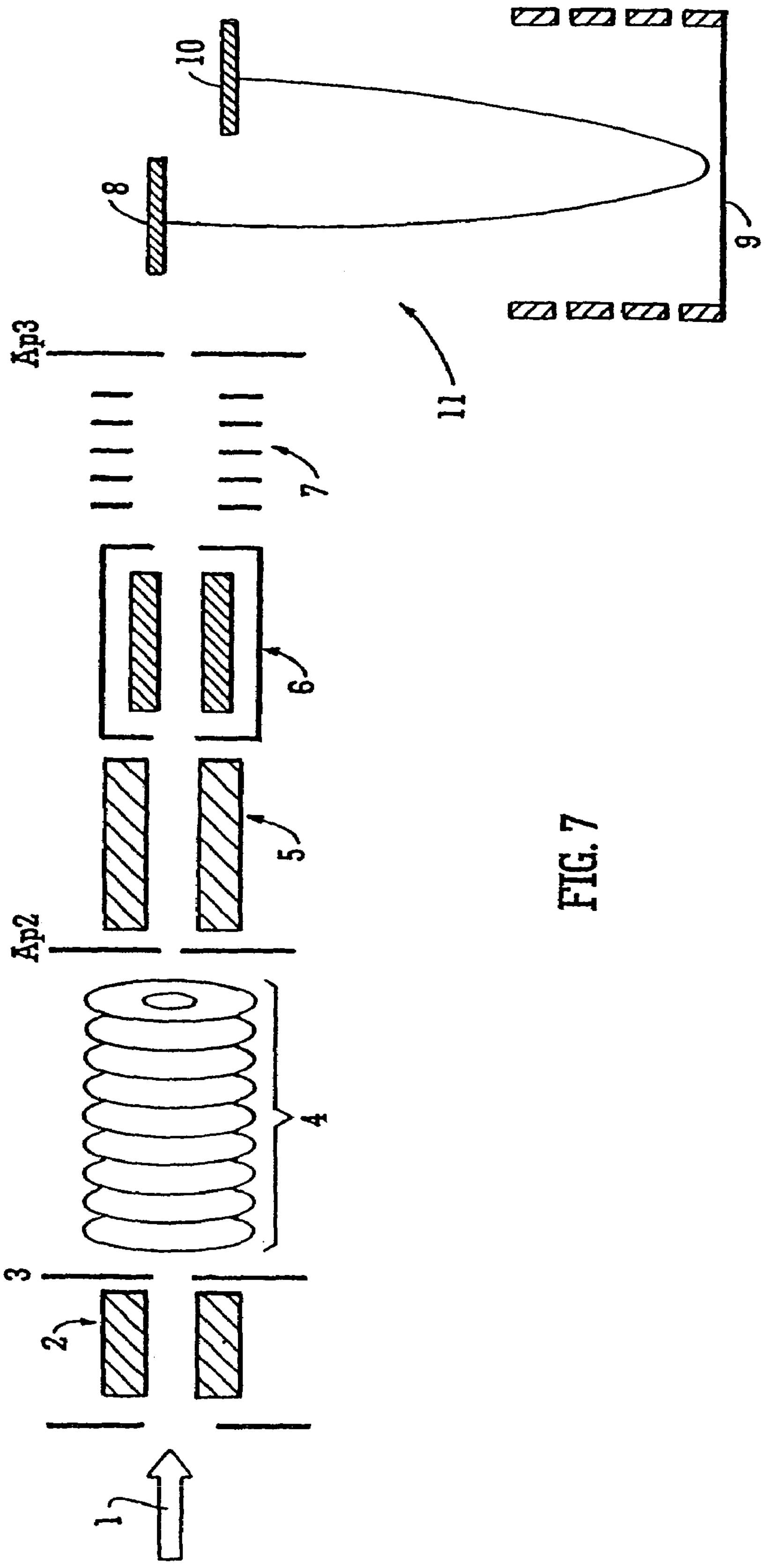
FIG. 7 shows a preferred embodiment of the present invention.
Figure 8A:
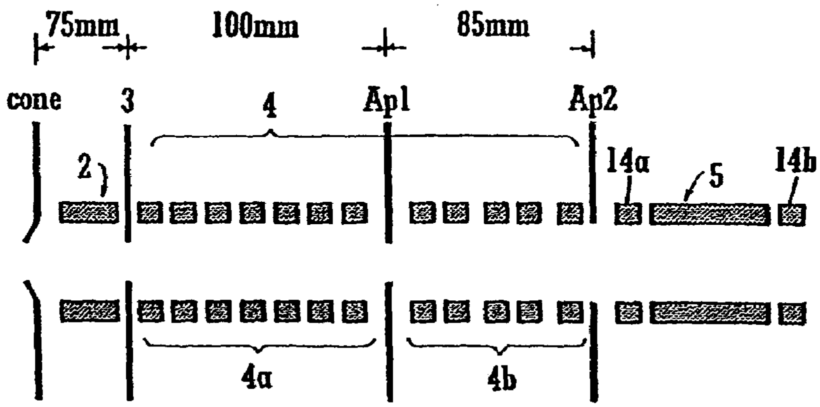
FIG. 8(*a*) illustrates a preferred embodiment of an ion trap, ion gate and ion mobility spectrometer.
Figure 8B:
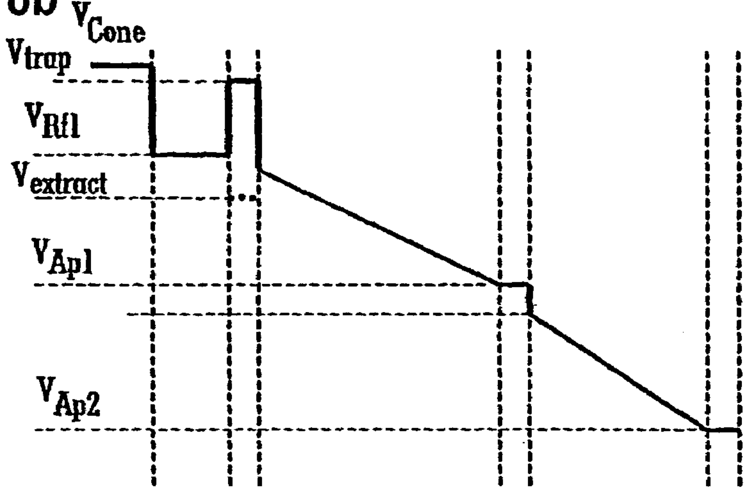
Figure 8C:
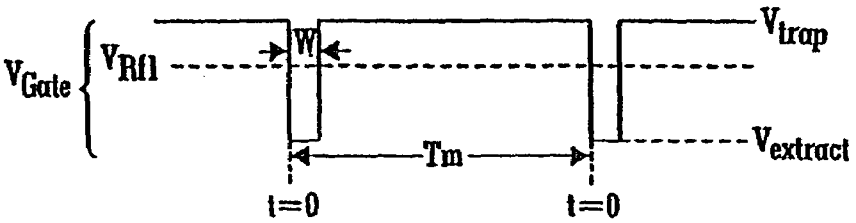
Figure 8D:
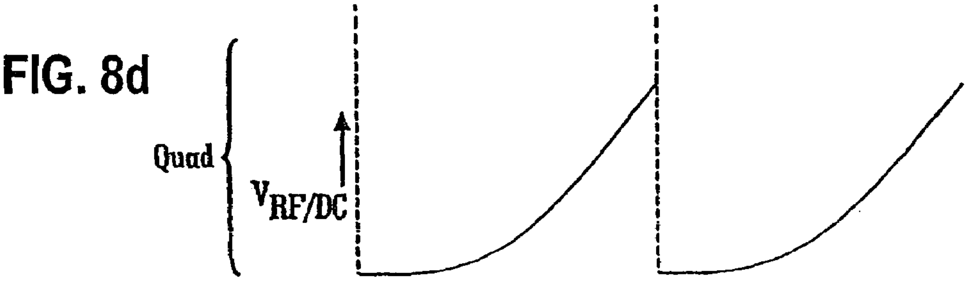
Figure 9:
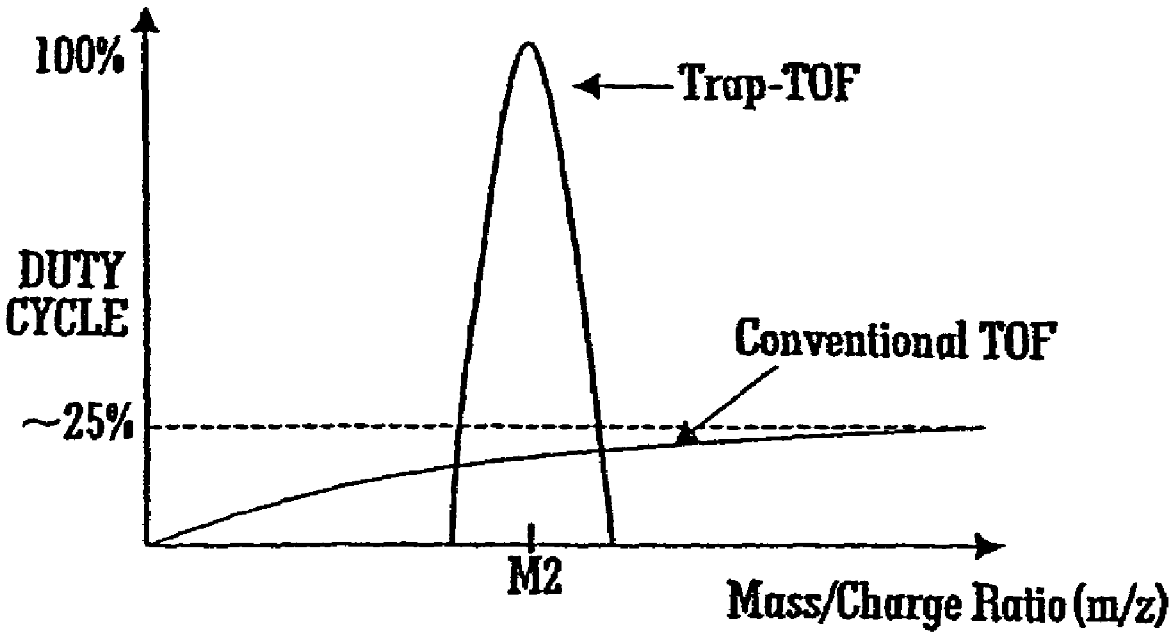
FIG. 9 illustrates how the duty cycle of an ion trap-time of flight mass analyser increases to approximately 100% for a relatively narrow mass to charge ratio range compared with a typical maximum duty cycle of approximately 25% obtained by operating the time of flight mass analyser in a conventional manner.

FIG. 7 shows a preferred embodiment of the present invention. An ion mobility spectrometer 4 is provided. A pulse of ions is admitted to the ion mobility spectrometer 4. A continuous ion source, e.g. an electrospray ion source, preferably generates a beam of ions 1 which are trapped in an upstream ion trap 2 upstream of the ion mobility spectrometer 4. In one embodiment ions are then pulsed out of the upstream ion trap 2 by the application of an extraction voltage to an ion gate 3 at the exit of the upstream ion trap 2.

The upstream ion trap 2 may comprise a quadrupole rod set having a length of approximately 75 mm. However, according to a more preferred embodiment the upstream ion trap 2 comprises an ion tunnel ion trap comprising a plurality of electrodes having apertures therein through which ions are transmitted. According to this embodiment a separate ion gate 3 does not need to be provided. The apertures are preferably all the same size or area. In other embodiments at least 60%, 65%, 70%, 75%, 80%, 85%, 90% or 95% of the electrodes have apertures which are substantially the same size or area. The ion tunnel ion trap 2 may preferably comprise at least 20, 30, 40 or 50 electrodes. Adjacent electrodes are preferably connected to opposite phases of an AC or RF voltage supply so that ions are radially confined in use within the ion tunnel ion trap 2. According to the preferred embodiment the voltages applied to at least some of the electrodes forming the upstream ion trap 2 can be independently controlled. In one mode of operation a "V" shaped axial DC potential profile may be created so that a single trapping region is formed within the ion trap 2. According to another mode of operation it is possible to create a "W" shaped potential profile i.e. two trapping regions are provided within the ion trap 2.

The voltage applied to the ion gate 3 and/or to a region of the ion trap 2 may be dropped for a short period of time thereby causing ions to be ejected from the ion trap 2 in a substantially pulsed manner into the ion mobility spectrometer 4.

In less preferred embodiments, a pulsed ion source such as a Matrix Assisted Laser Desorption Ionisation ("MALDI") ion source or a Laser Desorption Ionisation ion source may be used instead of a continuous ion source. If a pulsed ion source is used, then ion trap 2 and ion gate 3 may be omitted in some modes of operation.

The ion mobility spectrometer 4 is a device which causes ions to become temporally separated based upon their ion mobility. A number of different forms of ion mobility spectrometer may be used.

In one embodiment, the ion mobility spectrometer 4 may comprise an ion mobility spectrometer consisting of a drift tube having a number of guard rings distributed within the drift tube. The guard rings may be interconnected by equivalent valued resistors and connected to a DC voltage source. A linear DC voltage gradient is generated along the length of the drift tube. The guard rings are not connected to an AC or RF voltage source.

In another embodiment, the ion mobility spectrometer 4 may comprise a Field Asymmetric Ion Mobility Spectrometer ("FAIMS").

According to a particularly preferred embodiment the ion mobility spectrometer 4 comprises an ion tunnel arrangement comprising a number of ring, annular or plate electrodes, or more generally electrodes having an aperture therein through which ions are transmitted. The apertures are preferably all the same size or area and are preferably circular. In other less preferred embodiments at least 60%, 65%, 70%, 75%, 80%, 85%, 90% or 95% of the electrodes have apertures which are substantially the same size or area. A schematic example of a preferred ion mobility spectrometer 4 is shown in FIG. 8(*a*). The ion mobility spectrometer 4 may comprise a plurality of electrodes 4*a*,4*b* which are either arranged in a single vacuum chamber or, as shown in FIG. 8(*a*), are arranged in two adjacent vacuum chambers separated by a differential pumping aperture Ap1. In one embodiment, the portion of the ion mobility spectrometer 4a in an upstream vacuum chamber may have a length of approximately 100 mm, and the portion of the ion mobility spectrometer 4b in a downstream vacuum chamber may have a length of approximately 85 mm. The ion trap 2, ion gate 3 and upstream portion 4a of the ion mobility spectrometer 4 are all preferably provided in the same vacuum chamber which is preferably maintained, in use, at a pressure within the range 0.1–10 mbar. According to less preferred embodiments, the vacuum chamber housing the upstream portion 4a may be maintained at a pressure greater than 10 mbar up to a pressure at or near atmospheric pressure. Also, according to less preferred embodiments, the vacuum chamber may alternatively be maintained at a pressure below 0.1 mbar.

In an embodiment the electrodes comprising the ion trap 2 are maintained at a DC voltage $V_{rf1}$. Ion gate 3 may be held normally at a higher DC voltage $V_{trap}$ than $V_{rf1}$, but the voltage applied to the ion gate 3 may be periodically dropped to a voltage $V_{extract}$ which is preferably lower than $V_{rf1}$ thereby causing ions to be accelerated out of the ion trap 2 and to be admitted into the ion mobility spectrometer 4.

According to a more preferred embodiment, ion trap 2 may comprise an ion tunnel ion trap 2 preferably having a V-shaped axial DC potential profile in a mode of operation. In order to release ions from the ion trap 2 the DC voltage gradient on the second (downstream) half of the ion trap 2 may be lowered or otherwise reduced or varied so as to accelerate ions out of the ion trap 2.

Adjacent electrodes which form part of the ion trap 2 are preferably connected to opposite phases of a first AC or RF voltage supply. The first AC or RF voltage supply preferably has a frequency within the range 0.1–3.0 MHz, preferably 0.5–1.1 MHz, further preferably 780 kHz.

Alternate electrodes forming the upstream section 4a of the ion mobility spectrometer 4 are preferably capacitively coupled to opposite phases of the first AC or RF voltage supply.

The electrodes comprising the ion trap 2, the electrodes comprising the upstream portion 4a of the ion mobility spectrometer 4 and the differential pumping aperture Ap1 separating the upstream portion 4a from the downstream portion 4b of the ion mobility spectrometer 4 are preferably interconnected via resistors to a DC voltage supply which in one embodiment comprises a 400 V supply. The resistors interconnecting electrodes forming the upstream portion 4a of the ion mobility spectrometer 4 may be substantially equal in value in which case an axial DC voltage gradient is obtained similar to that shown in FIG. 8(*b*). The DC voltage gradient is shown for ease of illustration as being linear, but may more preferably be stepped. The applied AC or RF voltage is superimposed upon the DC voltage and serves to radially confine ions within the ion mobility spectrometer 4. The DC voltage $V_{trap}$ or $V_{extract}$ applied to the ion gate 3 preferably floats on the DC voltage supply. The first AC or RF voltage supply is preferably isolated from the DC voltage supply by a capacitor.

In a similar manner, alternate electrodes forming the downstream portion 4b of the ion mobility spectrometer 4 are preferably capacitively coupled to opposite phases of a second AC or RF voltage supply. The second AC or RF voltage supply preferably has a frequency in the range 0.1–3.0 MHz, preferably 1.8–2.4 MHz, further preferably 2.1 MHz. In a similar manner to the upstream portion 4a, a substantially linear or stepped axial DC voltage gradient is maintained along the length of the downstream portion 4b of the ion mobility spectrometer 4. As with the upstream portion 4a, the applied AC or RF voltage is superimposed upon the DC voltage and serves to radially confine ions within the ion mobility spectrometer 4. The DC voltage gradient maintained across the upstream portion 4a is preferably not the same as the DC voltage gradient maintained across the downstream portion 4b. According to a preferred embodiment, the DC voltage gradient maintained across the upstream portion 4a is greater than the DC voltage gradient maintained across the downstream portion 4b.

The pressure in the vacuum chamber housing the downstream portion 4b is preferably in the range $10^{-3}$ to $10^{-2}$ mbar. According to less preferred embodiments, the pressure may be above $10^{-2}$ mbar, and could be similar in pressure to the pressure of the vacuum chamber housing the upstream portion 4a. It is believed that the greatest temporal separation of ions occurs in the upstream portion 4a due to the higher background gas pressure. If the pressure is too low then the ions will not make enough collisions with gas molecules for a noticeable temporal separation of the ions to occur.

The size of the orifice in the ion gate 3 is preferably of a similar size or is substantially the same internal diameter or size as the differential pumping aperture Ap1. Downstream of the ion mobility spectrometer 4 another differential pumping aperture Ap2 may be provided leading to a vacuum chamber housing a quadrupole mass filter 5. Pre- and post-filters 14a,14b may be provided.

In another embodiment the ion mobility spectrometer 4 may comprise an ion tunnel comprised of a plurality of segments. In one embodiment 15 segments may be provided. Each segment may comprise two electrodes having apertures interleaved with another two electrodes having apertures. All four electrodes in a segment are preferably maintained at the same DC voltage but adjacent electrodes are connected to opposite phases of the AC or RF supply. The DC and AC/RF voltage supplies are isolated from one another. Preferably, at least 90% of all the electrodes forming the ion tunnel comprised of multiple segments have apertures which are substantially similar or the same in size or area.

Typical drift times through the ion mobility spectrometer 4 are of the order of a few ms.

An important feature of the preferred embodiment is the provision of a mass filter 5 which is varied in a specified manner in conjunction with the operation of the ion mobility spectrometer 4. According to the preferred embodiment a quadrupole rod set mass filter 5 is used.

If the mass filter 5 is synchronised to the start of a pulse of ions being admitted into the ion mobility spectrometer 4, then the mass filter 5 can be set to transmit (in conjunction with the operation of the ion mobility spectrometer 5) only those ions having a mass to charge ratio that corresponds at any particular point in time with the charge state of the ions of interest. Preferably, the mass filter 5 should be able to sweep the chosen mass to charge ratio range on at least the time scale of ions drifting through the drift region. In other words, the mass filter 5 should be able to be scanned across the desired mass to charge ratio range in a few milliseconds. Quadrupole mass filters 5 are capable of operating at this speed.

According to the preferred embodiment, either the AC (or RF) voltage and/or the DC voltage applied to the quadrupole mass filter 5 may be swept in synchronisation with the pulsing of ions into the ion mobility spectrometer 4. As discussed above in relation to FIGS. 5 and 6, the quadrupole mass filter 5 may be operated in either a high pass or band pass mode depending on whether e.g. multiply charged ions are preferred in general, or whether ions having a specific charge state are preferred. The varying of a mass filtering characteristic of the quadrupole mass filter 5 is such that ions having a favoured charge state (or states) are preferably onwardly transmitted, preferably to the at least near exclusion of other charge states, for at least part of the cycle time Tm between pulses of ions being injected into the ion mobility spectrometer 4. FIGS. 8(*c*) and (*d*) show the inter-relationship between ions being pulsed out of the ion trap 2 into the ion mobility spectrometer 4, and the scanning of the mass filter 5. Synchronisation of the operation of the mass filter 5 with the drift times of desired ions species through the ion mobility spectrometer 4 enables a duty cycle of approximately 100% to be obtained for ions having the charge state(s) of interest.

Referring back to FIG. 7, a downstream ion trap 6 is provided downstream of the ion mobility spectrometer 4 and the quadrupole mass filter 5. According to a particularly preferred embodiment, the downstream ion trap 6 comprises a collision (or gas) cell 6. Ions may be arranged so that they are sufficiently energetic when they enter the collision cell 6 that they collide with gas molecules present in the gas cell 6 and fragment into daughter ions. Subsequent mass analysis of the daughter ions yields valuable mass spectral information about the parent ion(s). Ions may also be arranged so that they enter the gas or collision cell 6 with much less energy, in which case they may not substantially fragment. The energy of ions entering the collision cell 6 can be controlled by e.g. setting the level of a voltage gradient experienced by the ions prior to entering the collision cell 6. Since the voltage gradient can be switched near instantaneously, the collision cell 6 can, in effect, be considered to be switchable between a relatively high fragmentation mode and a relatively low fragmentation mode.

According to other less preferred embodiments instead of fragmenting ions in the gas cell 6, ions can be arranged to react with a gas present in the gas cell 6 to form product ions.

According to a particularly preferred embodiment, the gas cell 6 may comprise an ion tunnel ion trap similar to the upstream ion trap 2 and the ion mobility spectrometer 4 according to the preferred embodiment.

As such, the gas cell 6 may comprise a plurality of electrodes having apertures therein. The electrodes may take the form of rings or other annular shapes or rectangular plates. The apertures are preferably all the same size or area. In other embodiments at least 60%, 65%, 70%, 75%, 80%, 85%, 90% or 95% of the electrodes have apertures which are substantially the same size or area. The gas cell 6 may comprise approximately 50 electrodes. Adjacent electrodes are preferably connected to opposite phases of an AC or RF voltage supply so that ions are radially confined in use within the ion tunnel ion trap 6. According to the preferred embodiment the voltages applied to at least some of the electrodes forming the gas cell 6 can be independently controlled. This enables numerous different axial DC voltage profiles to be created along the length of the ion tunnel ion trap. In one mode of operation a "V" shaped potential profile is created so that a single trapping region is provided within the gas cell 6. A V-shaped DC potential profile comprises an upstream portion having a negative DC voltage gradient and a downstream portion having a positive DC voltage gradient so that (positive) ions become trapped towards the centre of the ion trap 6. If the positive DC voltage gradient maintained across the downstream portion of the ion trap 6 is then changed to a zero gradient or more preferably to a negative gradient, then (positive) ions will be accelerated out the ion trap 6 as a pulse of ions.

According to a particularly preferred embodiment, the gas cell 6 may act both as an ion trap and as a collision cell. The ion tunnel ion trap/collision cell 6 may comprise a plurality of segments (e.g. 15 segments), each segment comprising four electrodes interleaved with another four electrodes. All eight electrodes in a segment are preferably maintained at the same DC voltage, but adjacent electrodes are preferably supplied with opposite phases of an AC or RF voltage supply. A collision gas preferably nitrogen or argon may be supplied to the collision cell 6 at a pressure preferably of $10^{-3}$–$10^{-2}$ mbar. Ions may be trapped and/or fragmented in the ion trap/collision cell by appropriate setting of the DC voltages applied to the electrodes and the energy that ions are arranged to have upon entering the ion trap/collision cell 6.

Ion optical lenses 7 may be provided downstream of the collision cell 6 to help guide ions through a further differential pumping aperture Ap3 and into an analyser chamber containing a mass analyser. According to a particularly preferred embodiment, the mass analyser comprises an orthogonal acceleration time of flight mass analyser 11 having a pusher and/or puller electrode 8 for injecting ions or otherwise orthogonally accelerating them into an orthogonal drift region. A reflectron 9 is preferably provided for reflecting ions travelling through the orthogonal drift region back towards a detector 10. As is well known in the art, at least some of the ions in a packet of ions entering an orthogonal acceleration time of flight mass analyser will be orthogonally accelerated into the orthogonal drift region. Ions will become temporally separated in the orthogonal drift region in a manner dependent upon their mass to charge ratio. Ions having a lower mass to charge ratio will travel faster in the drift region and will reach the detector 10 prior to ions having a higher mass to charge ratio. The time it takes an ion to drift through the drift region and to reach the detector 10 can be used to accurately determine the mass to charge ratio of the ion in question. The intensity of ions and their mass to charge ratios can be used to produce a mass spectrum.

According to other less preferred embodiments, the downstream ion trap (gas cell) 6 may comprise a 3D-quadrupole ion trap comprising a central doughnut shaped electrode together with two endcap electrodes or a 2D ion trap. According to another less preferred embodiment, the downstream ion trap 6 may comprise a hexapole ion guide. However, this embodiment is less preferred since no axial DC voltage gradient is present to urge ions out of the hexapole ion guide. It is for this reason that an ion tunnel ion trap is particularly preferred.

Various modes of operation will now be described.

Figure 10:
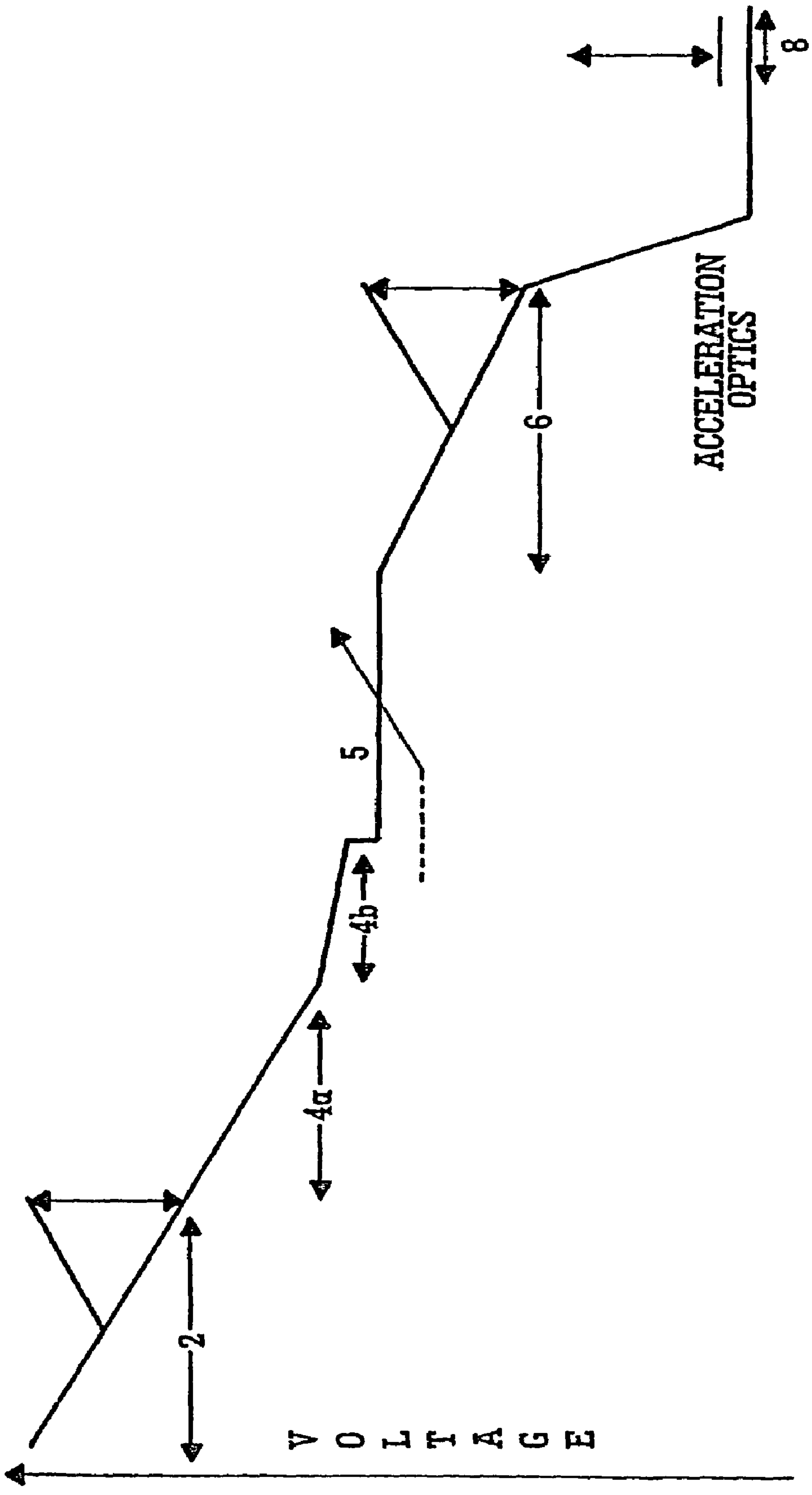
FIG. 10 illustrates a first mode of operation according to a preferred embodiment wherein precursor ions having a particular desired charge state(s) are selected and subsequently mass analysed with a 100% duty cycle.

A first mode of operation will now be described in relation to FIG. 10. According to this mode of operation the ion source can remain permanently on. A single upstream ion trap 2 is used and ions from the ion source are trapped in a "V" shaped potential in the upstream ion trap 2. The voltage applied across the second (downstream) half of the ion trap 2 is periodically dropped so that the "V" shaped potential is changed to a preferably linear potential gradient which causes ions to be accelerated out of the ion trap 2 and into the ion mobility spectrometer 4 which according to the preferred embodiment comprises an upstream portion 4*a* and a downstream portion 4*b*.

The ions become temporally separated as they pass through the ion mobility spectrometer 4. The ions then pass to a quadrupole mass filter 5 which is swept across the mass scale in a synchronised manner with the ion mobility spectrometer 4. As has already been described above, by synchronising the operation of the mass filter 5 with the ion mobility spectrometer 4 it is possible to select precursor ions having a desired charge state(s).

The precursor ions are then trapped and periodically released from a downstream ion trap 6 which according to the preferred embodiment is a fragmentation or collision cell 6. Due to the dispersion afforded by the ion mobility spectrometer 4, lighter ions of the selected charge state arrive in the gas cell 6 first.

It is apparent from FIG. 6 that at any particular point in time precursor ions having the desired charge state arriving at the ion tunnel/collision cell 6 will have a relatively small spread of mass to charge ratios.

In order to achieve a maximum duty cycle, the precursor ions are released or pulsed out of the downstream ion trap 6. A predetermined period of time later the ions are orthogonally accelerated by energising a pusher electrode 8 of the oa-TOF mass analyser 11. Substantially all the ions arriving at the pusher electrode 8 will be orthogonally accelerated into the drift region of the mass analyser 11. This process can, if desired, be repeated a number of times (for example 4–5 packets of ions can be sent to the mass analyser 11 without changing the delay time of the pusher electrode 8 relative to the release of ions from the ion trap 6). However, as time progresses, the ions arriving in the ion trap 6 will have a relatively higher average mass to charge ratio (but the spread of mass to charge ratios of the ions present in the ion trap 6 at any instance remain relatively low). When these ions are then released from the ion trap 6 the delay time before the pusher electrode 8 is energised is increased so as to ensure that these ions are also orthogonally accelerated with a near 100% duty cycle.

By optimising the ion trap-TOF (gas cell-pusher) 6,8 in this way precursor ions having a desired charge state can be selected and undesired background ions can be removed, and the precursor ions can be orthogonally accelerated in the drift region of a TOF mass analyser 11 with a near 100% duty cycle across the whole mass range of interest. This represent a significant advance in the art.

In addition to varying, preferably increasing, the predetermined time delay of the pusher electrode 8 it is also possible to adjust the length of the extraction pulse from the ion trap 6 such that the size of the packet of ions released from the ion trap 6 exactly fills the pusher electrode 8.

Figure 11:
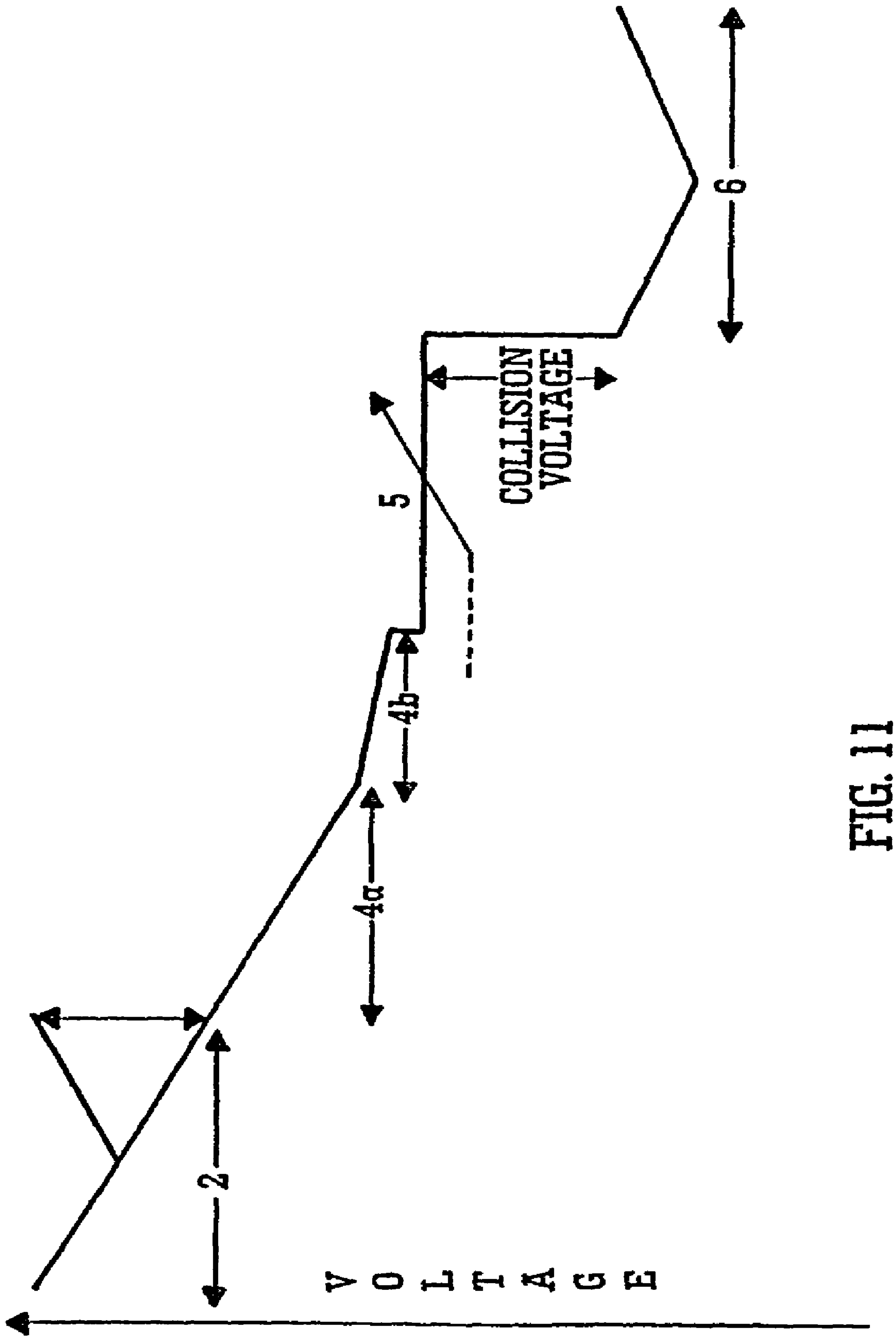
FIG. 11 illustrates a second mode of operation according to the preferred embodiment wherein precursor ions having a desired charge state(s) are fragmented or reacted and stored in a first ion trap.

A second mode of operation will now be described in relation to FIG. 11. In the first mode of operation it was possible to mass analyse multiply charged precursor ions with a high duty cycle having removed, for example, singly charged background ions. It order to help identify the precursor ions, the precursor ions can be fragmented (or reacted) and the fragment (or product) ions mass analysed.

According to the second mode of operation, precursor ions are fragmented (or reacted) and trapped in gas cell 6. FIG. 11 shows how fragment ions are generated and accumulated from precursor ions of the chosen charge state. In this case the first stages i.e. upstream ion trap 2, ion mobility spectrometer 4 and quadrupole mass filter 5 are operated in a similar manner to the first mode of operation except that the ions exiting the quadrupole mass filter 5 are arranged to be accelerated by a collision voltage into the gas cell 6 so as to induce fragmentation in the gas cell 6. The gas cell 6 is also operated as an ion trap to accumulate ions. Fragment ions are not then pulsed out of the ion trap 6 directly into the TOF mass analyser 11. Instead, as will be apparent from consideration of the third and fourth modes of operation described in more detail below, the fragment ions are sent back upstream of the ion trap 6. According to less preferred embodiments, a collision voltage may not be provided and precursor ions may instead be passed to the gas cell 6 to react with a gas to form product ions.

Figure 12:
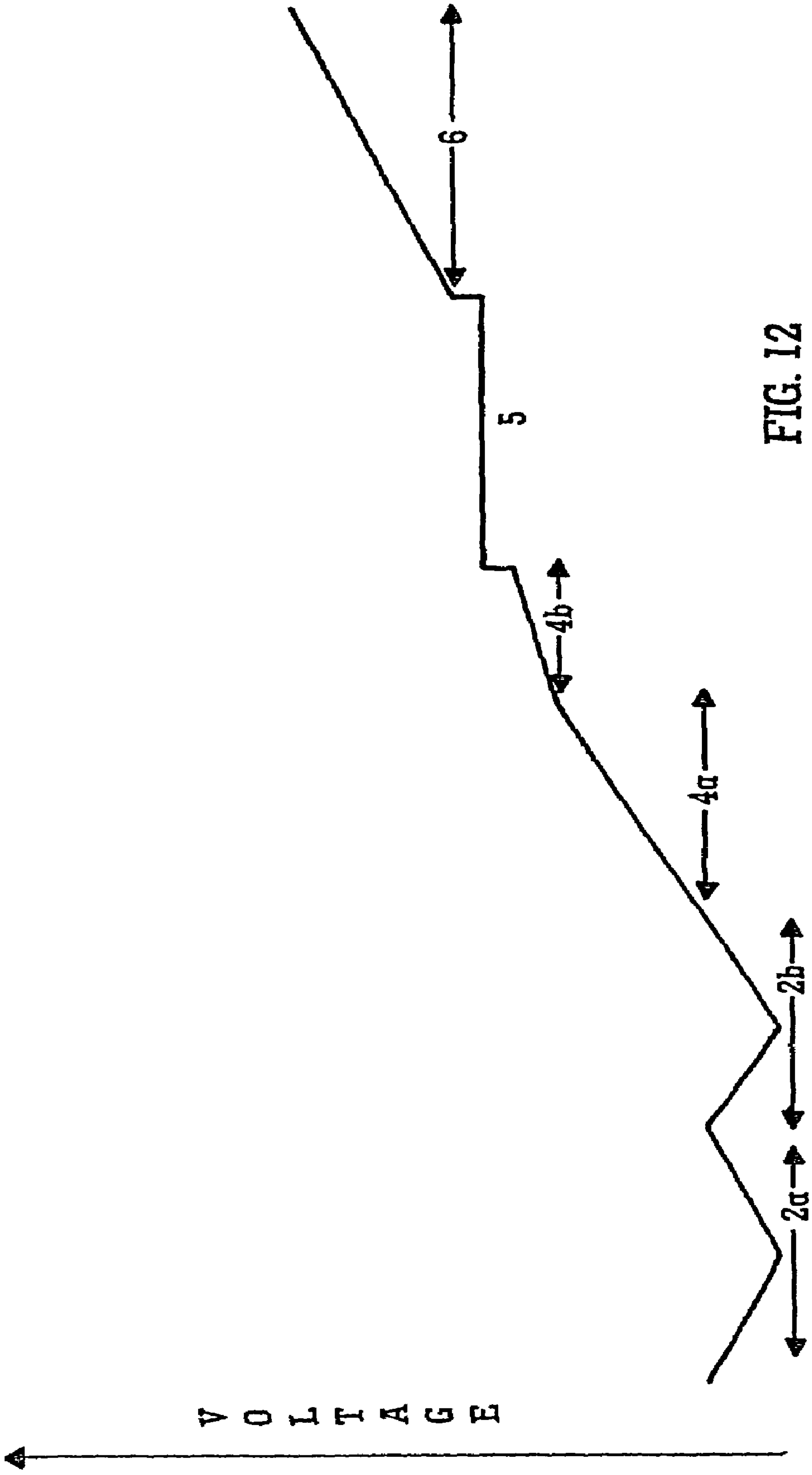
FIG. 12 illustrates a third mode of operation according to the preferred embodiment wherein fragment or product ions which have been accumulated in the first ion trap are sent back to an upstream ion trap whilst ions continue to be accumulated from the ion source.

A third mode of operation will now be described with reference to FIG. 12. After sufficient fragment (or product) ions have been accumulated in the gas cell 6, the potentials on the gas cell 6 are reversed and a second trapping stage **2*b* is preferably created in a downstream region of the upstream ion trap 2. This is preferably achieved by providing a "W" shaped potential profile across the ion tunnel ion trap 2. However, according to less preferred embodiments two discrete ion traps may be provided. The upstream region 2*a* of the upstream ion trap 2 may continue to accumulate ions generated by the ion source 1**.

The fragment (or product) ions present in the downstream ion trap 6 are accelerated out of the collision cell 6 and pass back through the quadrupole mass filter 5 and the ion mobility spectrometer **4*a*,4*b*. The mass filter 5 in this mode of operation is preferably operated in a wide band pass mode so that the fragment (or product) ions are not substantially mass filtered. As such, the mass filter 5** operates as an RF-only ion guide with a high transmission for all ions.

The fragment (or product) ions having passed through both the mass filter 5 and the ion mobility spectrometer **4*a*,4*b* then accumulate in the downstream region 2*b* of the upstream ion trap 2**.

Figure 13:
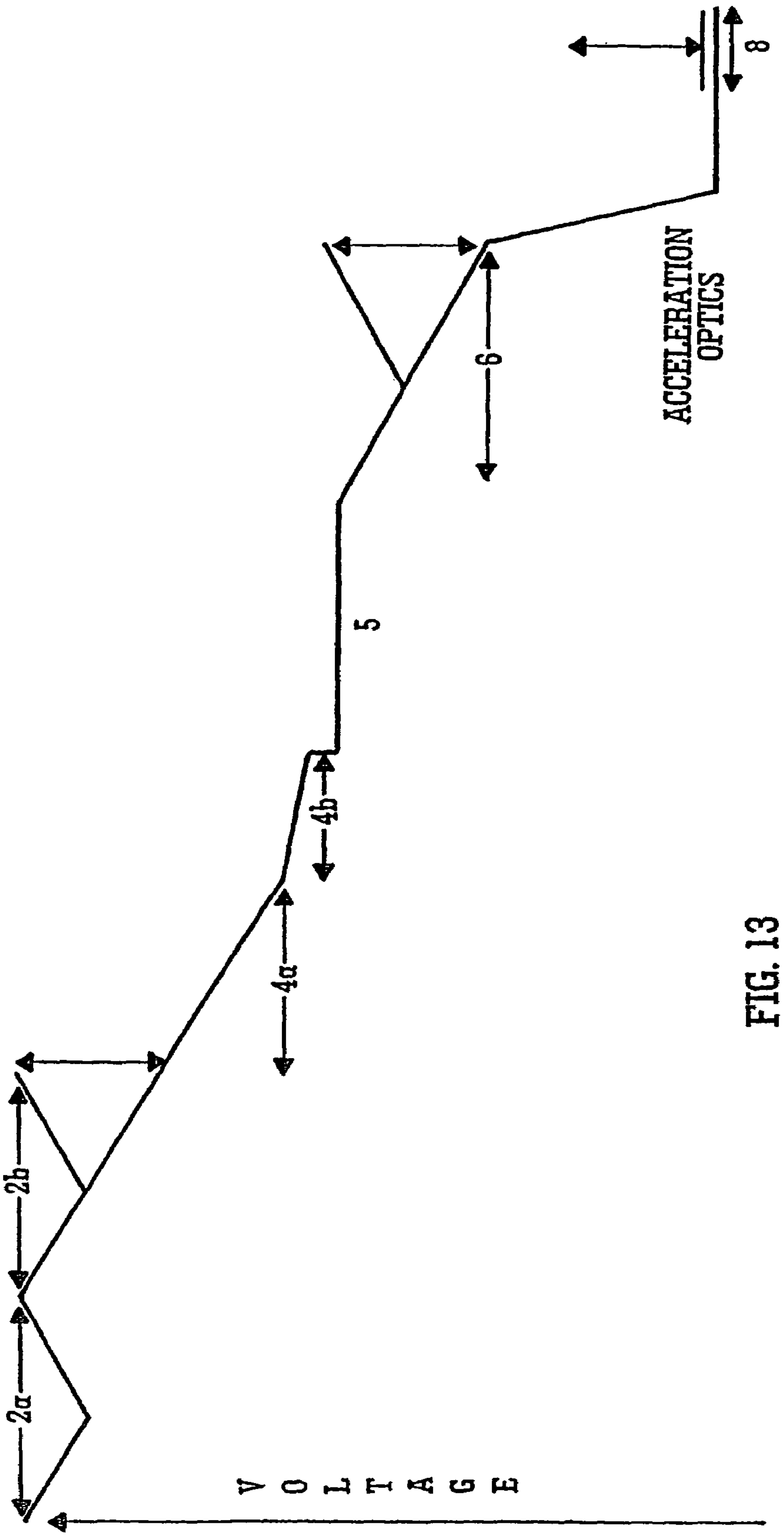
FIG. 13 illustrates a fourth mode of operation according to the preferred embodiment wherein fragment or product ions are separated according to their ion mobility and are subsequently mass analysed with a 100% duty cycle.

A fourth mode of operation will now be described in relation to FIG. 13. As can be seen, the fragment (or product) ions which have been accumulated in the downstream region **2*b* of the upstream ion trap 2** during the third mode of operation are now analysed in a similar but not identical manner to the way in which the precursor ions were analysed in first mode of operation. As such the fragment (or product) ions can be orthogonally accelerated into the mass analyser with a near 100% duty cycle.

The fragment (or product) ions are released from the downstream region **2*b* of the upstream ion trap 2 and are temporally separated in the ion mobility spectrometer 4*a*,4*b*. However, in contrast to the first mode of operation, the quadrupole mass filter 5 is preferably not swept. Rather, the mass filter 5 is preferably operated in a wide bandpass mode so as not to mass filter the fragment (or product) ions. As such, the quadrupole mass filter 5** operates in an RF-only ion guide mode.

In a similar manner to first mode of operation, temporally separated fragment (or product) ions are received and trapped in the gas cell/ion trap 6. The fragment (or product) ions are then periodically released from the ion trap 6 and are orthogonally accelerated in the drift region of the TOF mass analyser 11 after a predetermined time delay by energising the pusher electrode 8. As with the first mode of operation, as time progresses the fragment (or product) ions arriving at the downstream ion trap 6 have a higher average mass to charge ratio and accordingly the delay time can be adjusted (i.e. increased) so that the fragment (or product) ions continue to be orthogonally accelerated into the TOF mass analyser 11 with a near 100% duty cycle.

Figure 14:
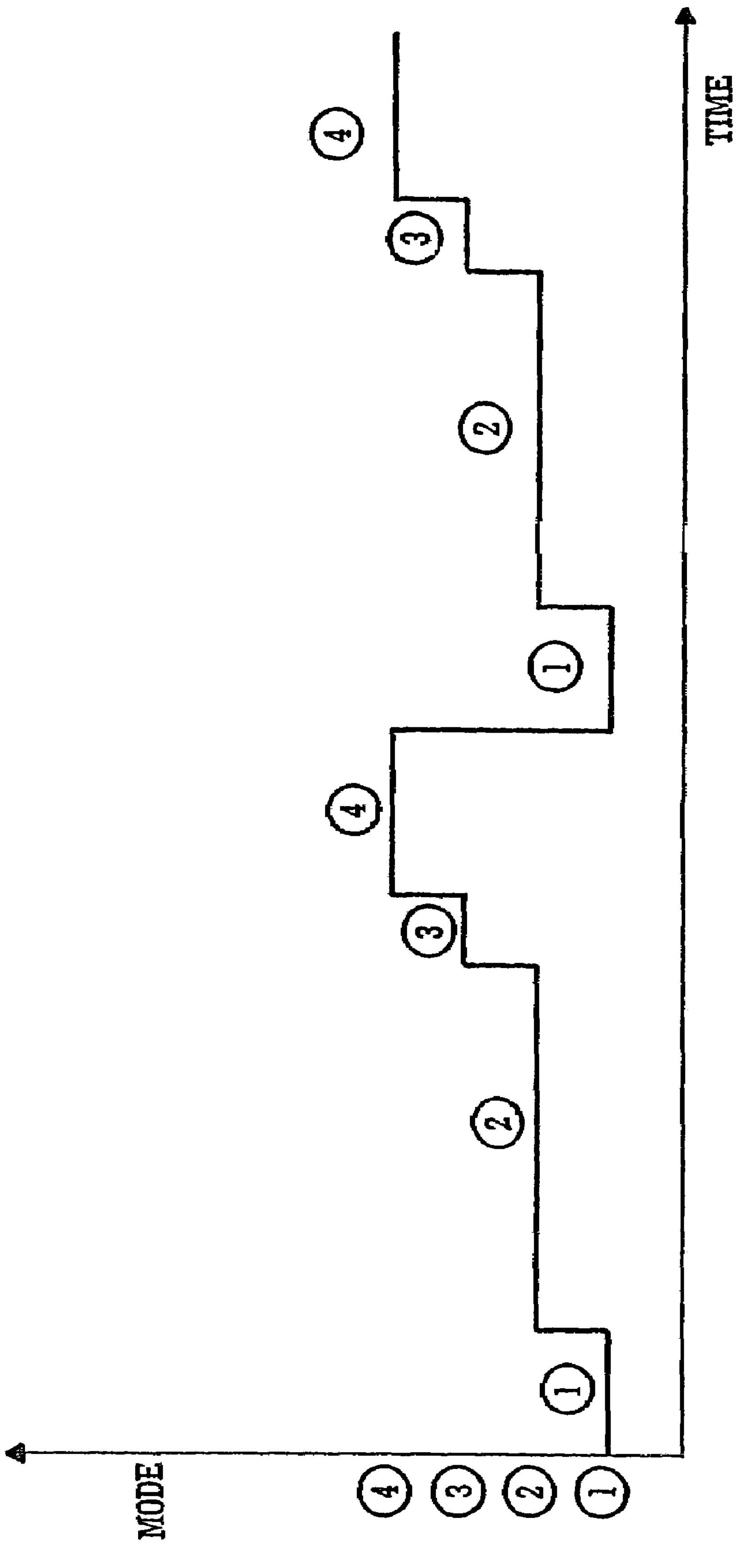
FIG. 14 shows a typical experimental cycling of modes of operation.

After completion of the fourth mode of operation, the instrument preferably returns to the first mode of operation and the whole cycle may be repeated as shown in FIG. 14.

The accumulation of the ions in the three trapping stages means that no ions are lost whilst other experiments are being performed. It should be noted that the proportion of time spent in each of the four modes shown in FIG. 14 can be varied according to the desired experiment e.g. it may be desirable to spend a large amount of time accumulating fragment (or product) ions so as to achieve good signal to noise.

According to the preferred embodiment the mass filter (e.g. quadrupole 5) has been shown and described as being downstream of the ion mobility spectrometer 4 in all modes of operation. However, according to other embodiments the mass filter (e.g. quadrupole 5) may be arranged upstream of the ion mobility spectrometer 4.

Furthermore, although the preferred embodiment has been described in relation to being able to filter out e.g. singly charged ions in preference to multiply charged ions, other embodiments are contemplated wherein singly charged ions are preferentially selected and onwardly transmitted whilst other charge state(s) are attenuated.

Other embodiments are also contemplated wherein the AC or RF voltage supplied to the electrode(s) in either the second ion trap 2, the ion mobility spectrometer 4 or the first ion trap/gas cell 6 may be non-sinusoidal and may, for example, take the form of a square wave.

Yet further embodiments are contemplated wherein other types of mass filter 5 are used instead of (or in addition to) a quadrupole mass filter 5. For example, a RF ring set or a RF ion trap (either 2D or 3D) may be used.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry, comprising the steps of:

selecting ions having a desired charge state(s) whilst filtering out ions having an undesired charge state(s);

trapping ions having said desired charge state(s) in an ion trap; and synchronising the release of ions from said ion trap with the operation of an electrode for orthogonally accelerating ions so that at least 70%, 80%, or 90% of the ions released from said ion trap are orthogonally accelerated by said electrode.

2. A method as claimed in claim 1, wherein said step of selecting ions having a desired charge state(s) comprises passing ions through an ion mobility spectrometer whilst scanning a quadrupole mass filter.

3. A mass spectrometer, comprising:

a device for selecting ions having a desired charge state(s) whilst filtering out ions having an undesired charge state(s);

an ion trap for trapping ions having a desired charge state(s); and wherein said ion trap is arranged to release ions in synchronisation with the operation of an electrode for orthogonally accelerating ions so that at least 70%, 80%, or 90% of the ions released from said ion trap are orthogonally accelerated by said electrode.

4. A mass spectrometer as claimed in claim 3, wherein said device for selecting ions comprises an ion mobility spectrometer and a quadrupole mass filter which is scanned in use.

5. A method of mass spectrometry, comprising the steps of:

separating fragment or product ions according to their ion mobility;

trapping some fragment or product ions in an ion trap; and synchronising the release of fragment or product ions from said ion trap with the operation of an electrode for orthogonally accelerating ions so that at least 70%, 80%, or 90% of the fragment or product ions released from said ion trap are orthogonally accelerated by said electrode.

6. A method of mass spectrometry as claimed in claim 5, wherein said step of separating fragment or product ions comprises passing said fragment or product ions through an ion mobility spectrometer.

7. A mass spectrometer, comprising:

a device for separating fragment or product ions according to their ion mobility; and an ion trap for trapping some fragment or product ions;

wherein said ion trap is arranged to release fragment or product ions in synchronisation with the operation of an electrode for orthogonally accelerating ions so that at least 70%, 80%, or 90% of the fragment or product ions released from said ion trap are orthogonally accelerated by said electrode.

8. A mass spectrometer as claimed in claim 7, wherein said device for separating fragment or product ions comprises an ion mobility spectrometer.

* * * * *